(12) United States Patent
Twarog et al.

(10) Patent No.: US 10,721,812 B2
(45) Date of Patent: Jul. 21, 2020

(54) ASYMMETRIC CONSUMABLES FOR A PLASMA ARC TORCH

(71) Applicant: Hypertherm, Inc., Hanover, NH (US)

(72) Inventors: Peter Twarog, Meriden, NH (US);
Clifford G. Darrow, Lyme, NH (US);
E. Michael Shipulski, Etna, NH (US);
Martin Higgens, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 280 days.

(21) Appl. No.: 15/685,659

(22) Filed: Aug. 24, 2017

(65) Prior Publication Data

US 2018/0007773 A1 Jan. 4, 2018

Related U.S. Application Data

(63) Continuation-in-part of application No. 15/350,742, filed on Nov. 14, 2016, now Pat. No. 9,781,818, which is a continuation-in-part of application No. 14/297,100, filed on Jun. 5, 2014, now Pat. No. 9,497,845, which is a continuation-in-part of
(Continued)

(51) Int. Cl.
*B23K 10/00* (2006.01)
*H05H 1/34* (2006.01)

(52) U.S. Cl.
CPC .............. *H05H 1/34* (2013.01); *B23K 10/00* (2013.01); *H05H 2001/3463* (2013.01); *Y10T 29/49778* (2015.01)

(58) Field of Classification Search
CPC .... H05H 1/34; H05H 1/26; H05H 2001/3463; B23K 10/00; Y10T 29/49778

USPC ......... 219/121.5, 121.51, 121.52, 121.48, 75
See application file for complete search history.

(56) References Cited

U.S. PATENT DOCUMENTS

| 3,707,615 A | 12/1972 | Rotolico et al. |
| 3,740,522 A | 6/1973 | Muehlberger |
| 4,423,304 A | 12/1983 | Bass et al. |

(Continued)

FOREIGN PATENT DOCUMENTS

| CN | 2394919 | 9/2000 |
| EP | 0634887 A1 | 1/1995 |
| FR | 2672459 A1 | 8/1992 |

OTHER PUBLICATIONS

International Search Report for International Application No. PCT/US2013/051989 dated Jan. 23, 2014, 4 pages.

*Primary Examiner* — Mark H Paschall
(74) *Attorney, Agent, or Firm* — Proskauer Rose LLP

(57) ABSTRACT

A consumable set for a plasma arc torch is provided. The consumable set comprises a consumable tip including a plurality of consumable components, at least one of which includes an asymmetric feature asymmetrically disposed in the consumable tip relative to a longitudinal axis. The consumable set also includes a mounting element for coupling the consumable tip to a torch body. The mounting element is configured to axially secure the consumable tip relative to the torch body while permitting independent rotation of the consumable tip relative to the longitudinal axis during assembly. The mounting element is also configured to both axially and radially fix the consumable tip with respect to the torch body such that the asymmetric feature is locked at the specific radial orientation relative to the longitudinal axis after securement.

21 Claims, 13 Drawing Sheets

Related U.S. Application Data application No. 13/567,260, filed on Aug. 6, 2012, now Pat. No. 9,107,282.

(60) Provisional application No. 62/379,071, filed on Aug. 24, 2016.

(56) References Cited

U.S. PATENT DOCUMENTS

| | | | |
|---|---|---|---|
| 4,839,492 A * | 6/1989 | Bouchier | A61B 17/3203 |
| | | | 219/121.39 |
| 4,877,937 A | 10/1989 | Muller | |
| 4,954,683 A | 9/1990 | Hatch | |
| 4,970,364 A | 11/1990 | Muller | |
| 5,014,916 A | 5/1991 | Trapani et al. | |
| D338,142 S | 8/1993 | Sarkissian | |
| 5,278,387 A | 1/1994 | Borne | |
| 5,334,235 A | 8/1994 | Dorfman et al. | |
| 5,360,495 A | 11/1994 | Schuler et al. | |
| 5,808,270 A | 9/1998 | Marantz et al. | |
| 5,837,959 A | 11/1998 | Muehlberger et al. | |
| 6,114,649 A | 9/2000 | Delcea | |
| 6,262,386 B1 | 7/2001 | Fornsel | |
| 6,353,200 B1 | 3/2002 | Schwankhart | |
| 6,657,152 B2 * | 12/2003 | Shimazu | B05B 7/226 |
| | | | 219/121.47 |
| 6,744,006 B2 | 6/2004 | Johnson et al. | |
| 8,624,150 B2 | 1/2014 | Simek et al. | |
| 9,211,603 B2 | 12/2015 | Severance, Jr. et al. | |
| 9,551,296 B2 | 1/2017 | Winkler et al. | |
| 2004/0140295 A1 | 7/2004 | Herres | |
| 2009/0039059 A1 | 2/2009 | Twarog et al. | |
| 2013/0236652 A1 | 9/2013 | Belashchenko | |
| 2014/0138360 A1 | 5/2014 | Hansen et al. | |
| 2014/0284312 A1 * | 9/2014 | Chen | H05H 1/34 |
| | | | 219/121.5 |
| 2015/0319833 A1 | 11/2015 | Molz | |
| 2017/0182585 A1 * | 6/2017 | Yamaguchi | B23K 10/00 |

* cited by examiner

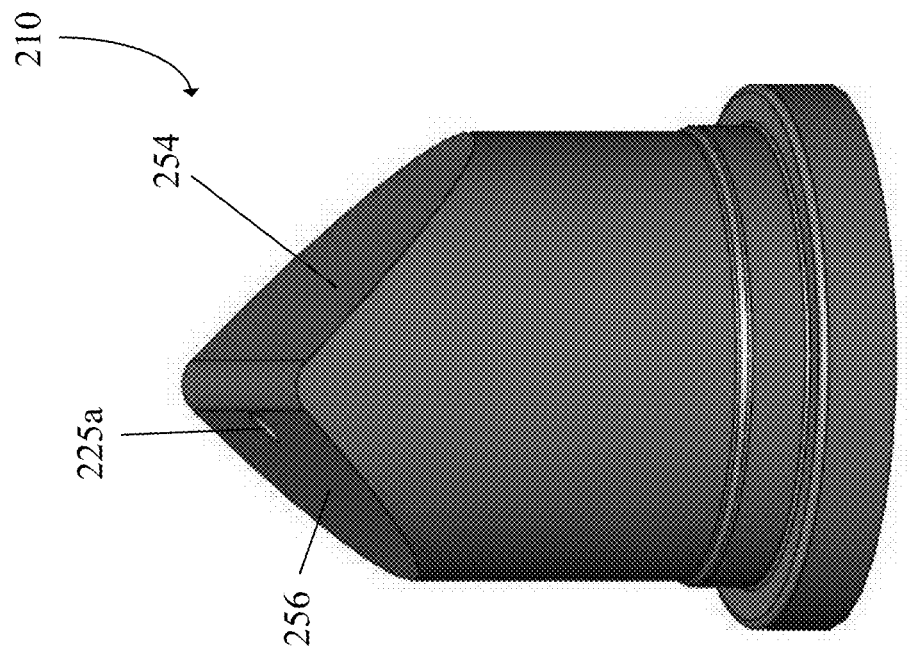
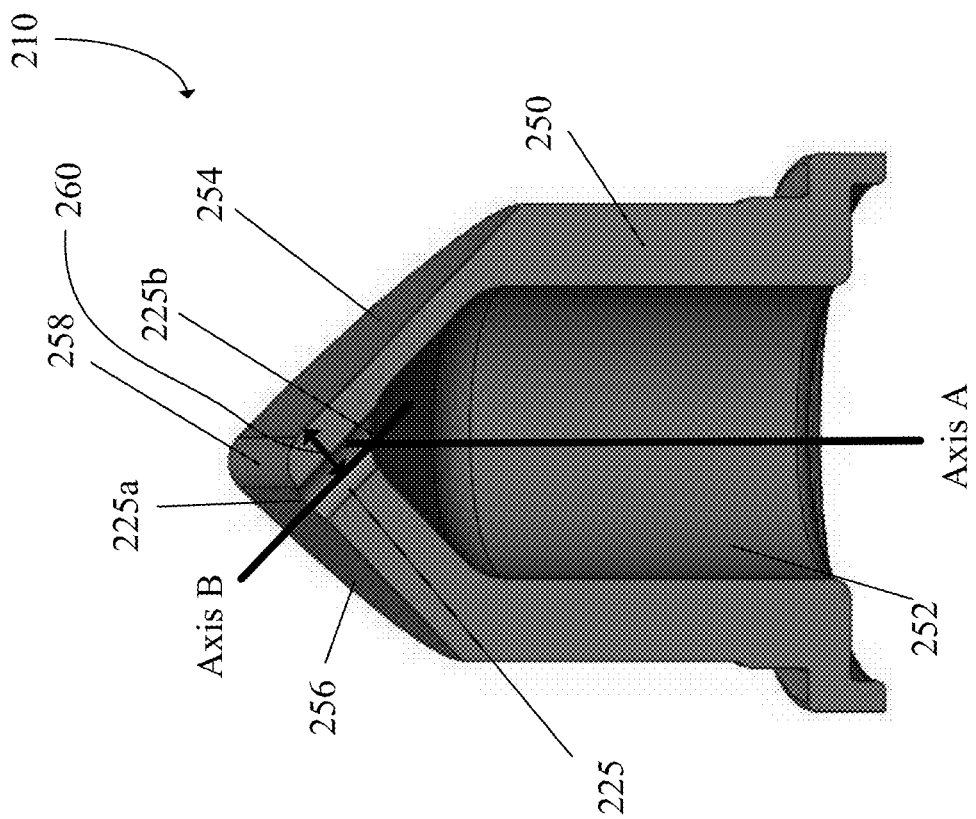
FIG. 2B
FIG. 2A

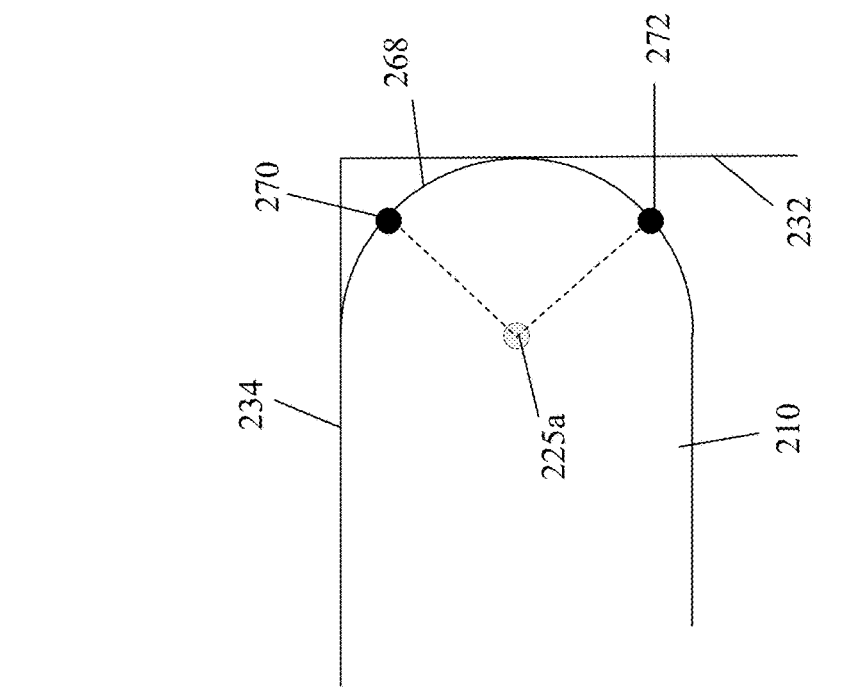
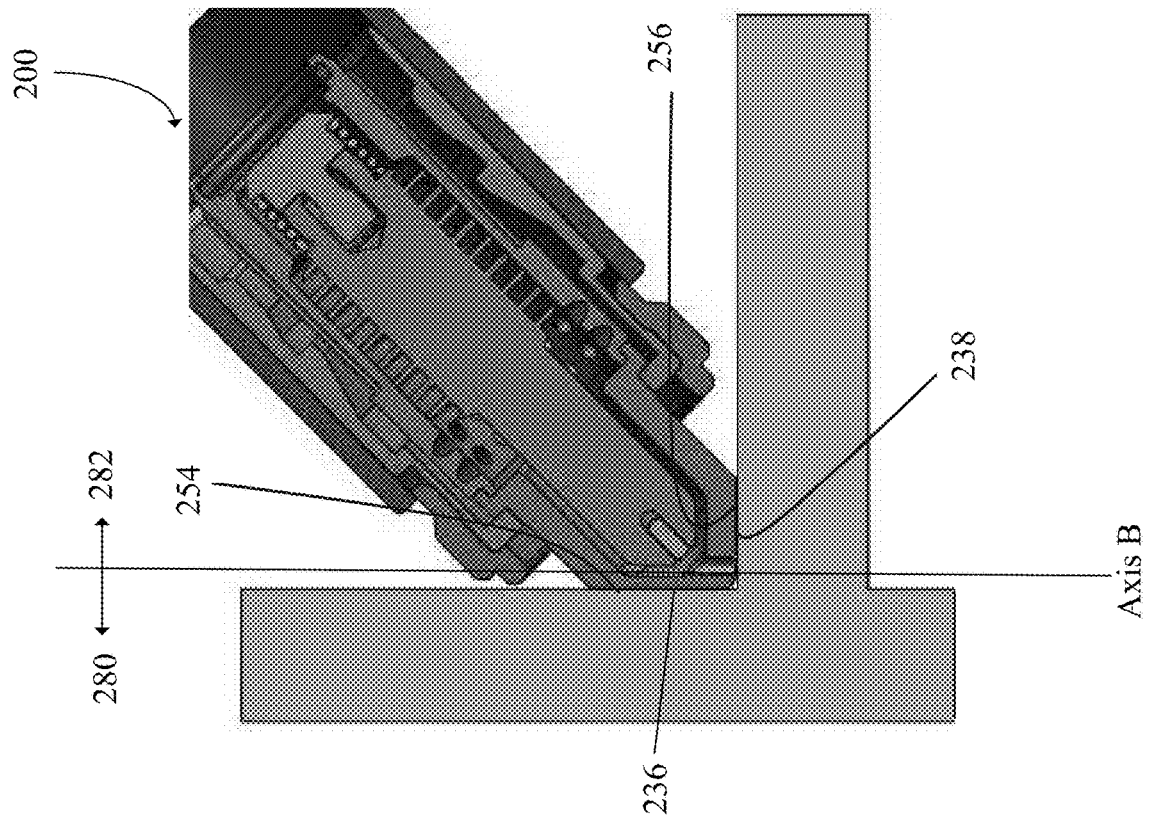
FIG. 4
FIG. 3

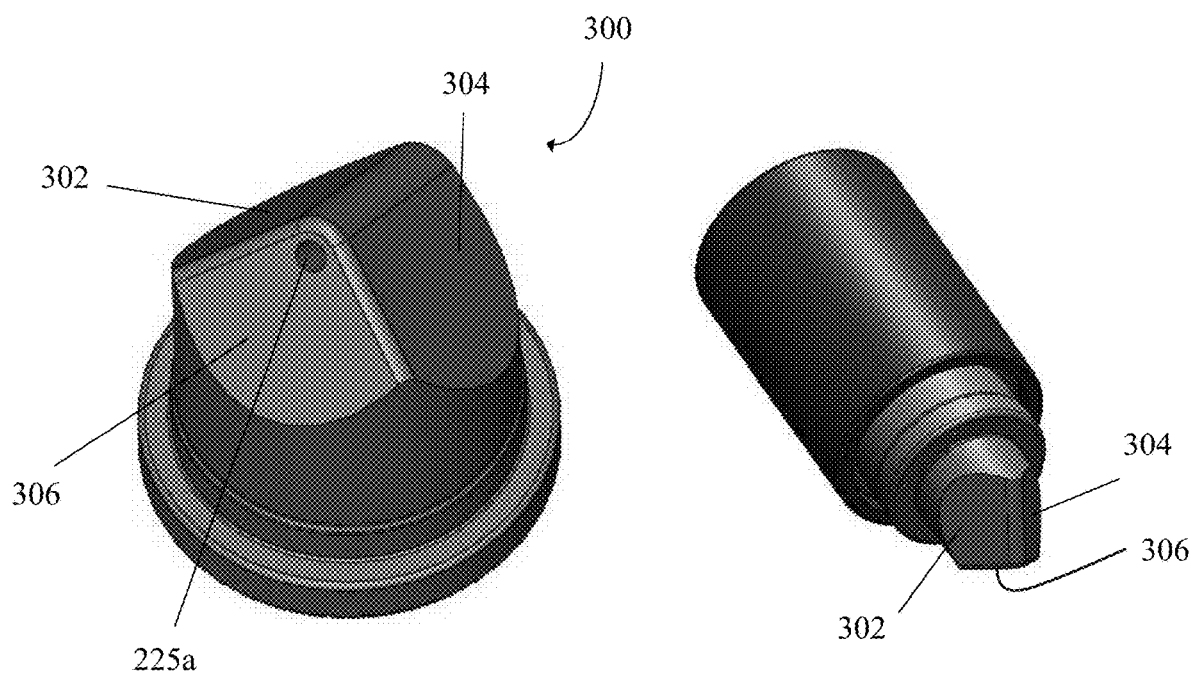
FIG. 5A     FIG. 5B
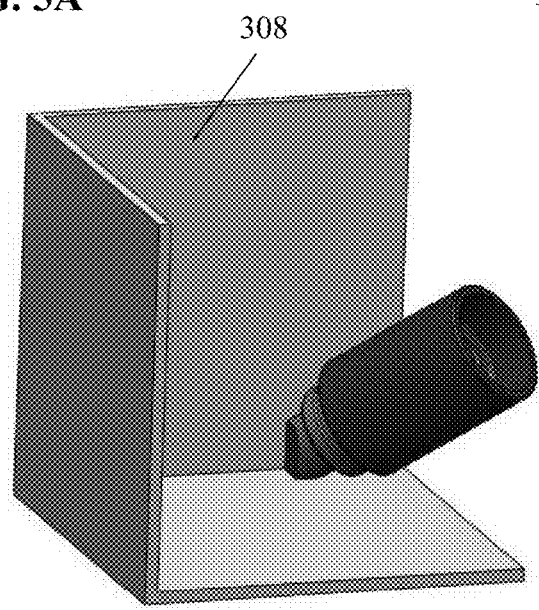
FIG. 5C

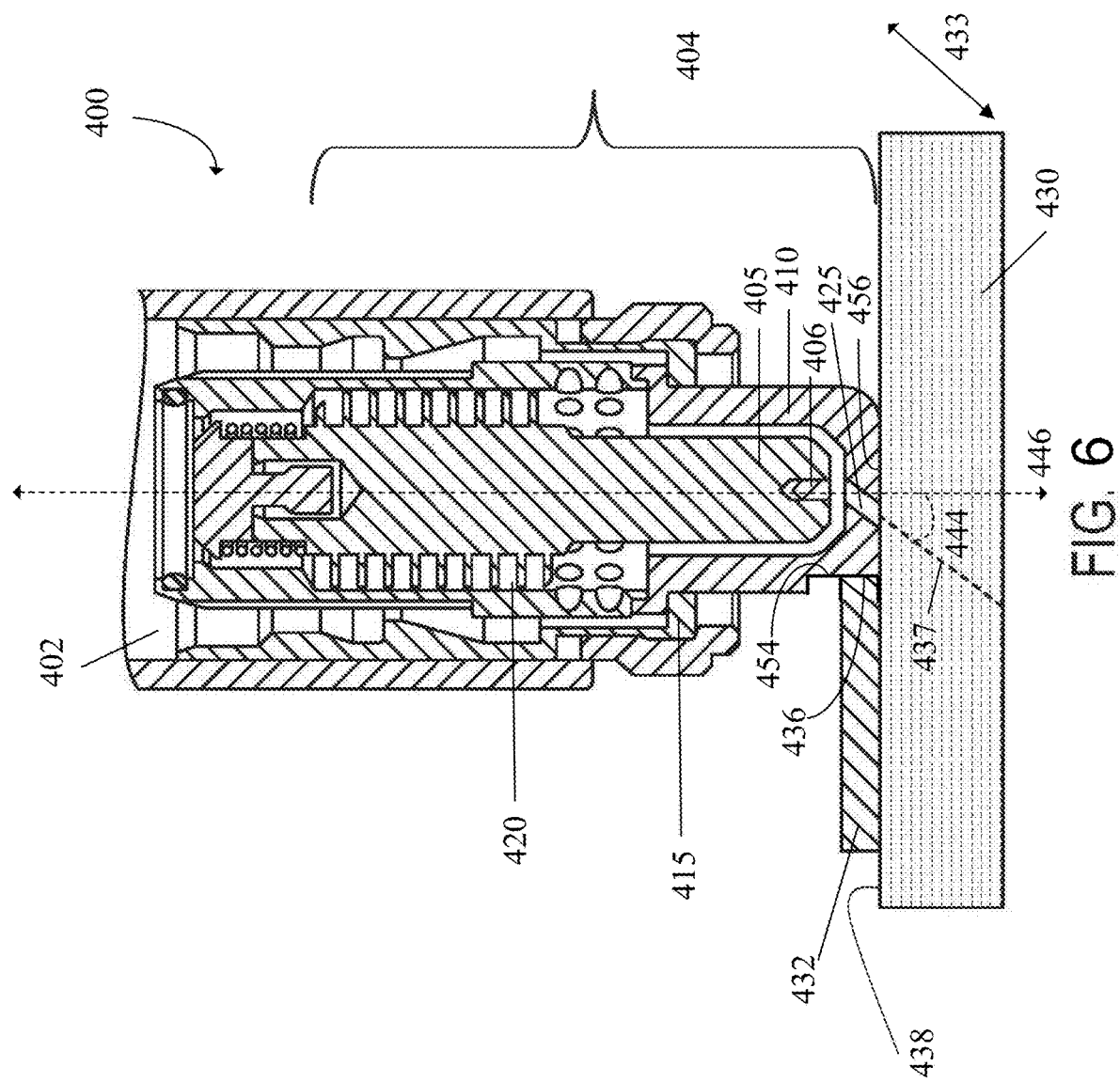

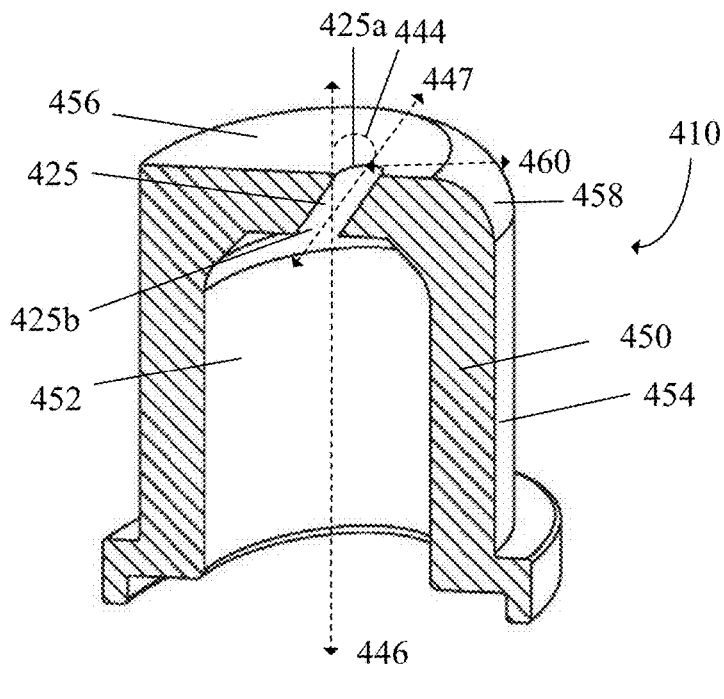
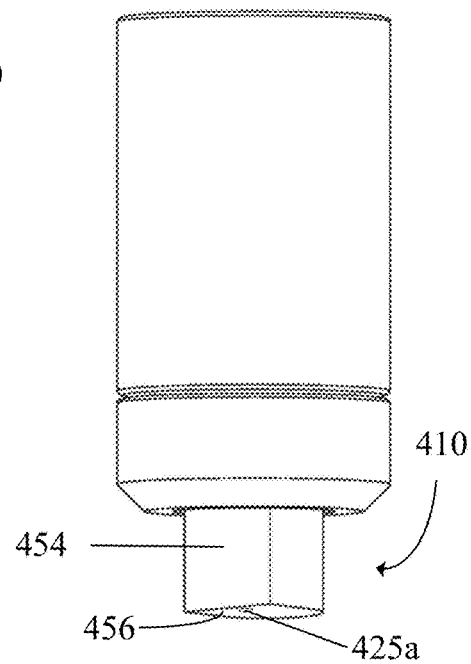
FIG. 7A  FIG. 7B
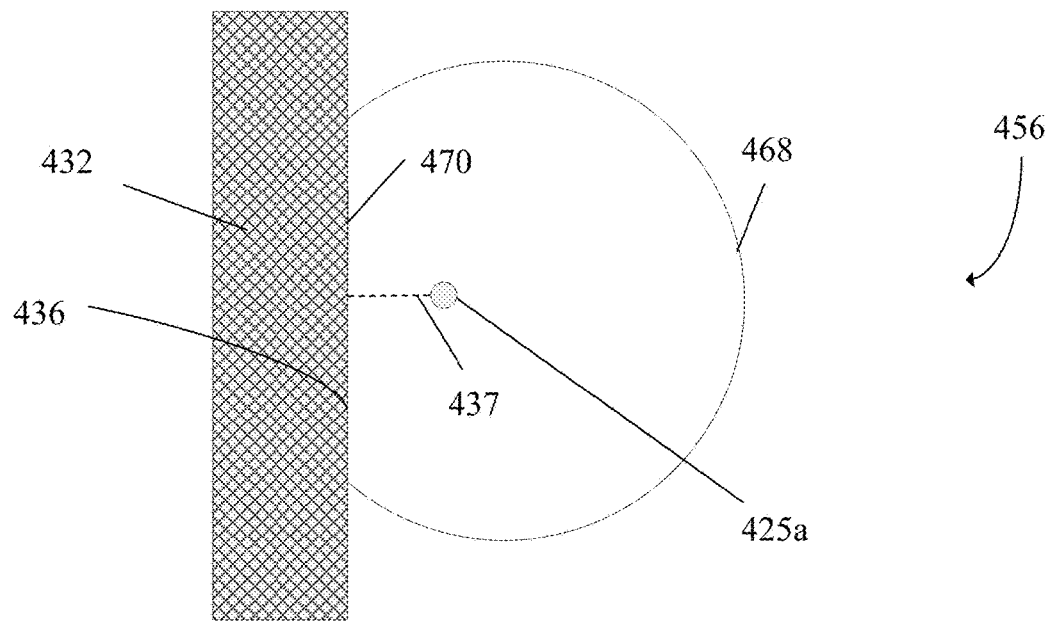
FIG. 8

ASYMMETRIC CONSUMABLES FOR A PLASMA ARC TORCH

CROSS REFERENCE TO RELATED APPLICATION

This application is a continuation in part of U.S. Ser. No. 15/350,742, filed Nov. 14, 2016, which is a continuation-in-part of U.S. Ser. No. 14/297,100, filed Jun. 5, 2014, now U.S. Pat. No. 9,497,845, which is a continuation-in-part of U.S. Ser. No. 13/567,260, filed Aug. 6, 2012, now U.S. Pat. No. 9,107,282, all of which are owned by the assignee of the instant application and the entirety of each of which are incorporated herein by reference. This application also claims the benefit of and priority to U.S. Provisional Patent Application No. 62/379,071, filed Aug. 24, 2016, the entire content of which is owned by the assignee of the instant application and is incorporated herein by reference in its entirety.

FIELD OF THE INVENTION

The present invention relates generally to one or more consumables that can be attached to a plasma arc torch at a specific radial orientation relative to a longitudinal axis of the torch.

BACKGROUND OF THE INVENTION

Thermal processing torches, such as plasma arc torches, are widely used in the heating, cutting, gouging and marking of materials. A plasma arc torch generally includes an electrode, a nozzle having a central exit orifice mounted within a torch body, electrical connections, passages for cooling, and passages for arc control fluids (e.g., plasma gas). Optionally, a swirl ring is employed to control fluid flow patterns in the plasma chamber formed between the electrode and the nozzle. In some torches, a retaining cap can be used to maintain the nozzle and/or swirl ring in the plasma arc torch. In operation, the torch produces a plasma arc, which is a constricted jet of an ionized gas with high temperature and sufficient momentum to assist with removal of molten metal.

Most of the existing consumables are symmetrical and thus can mount onto a plasma arc torch symmetrically about a longitudinal axis of the torch. As a result, these symmetrical consumables can be positioned at an infinite number of angles relative the longitudinal axis of the torch without affecting the operation or performance of the overall system. Exemplary methods for achieving such a symmetrical attachment include threading, cylindrical detent, or others that are based on a non-angle specific interface. However, even though symmetrical consumable attachment simplifies manufacture and installation of individual consumables, it can limit utilization, design space and customization of the consumables.

Therefore, there is a need to design interfaces that can attach a single consumable (e.g., an asymmetric consumable) and/or a suite of multiple consumables to a plasma arc torch such that the consumable(s) are clocked to the torch at a desired radial orientation relative to the longitudinal axis of the torch. This asymmetrical attachment enables torch functions (e.g., asymmetric cutting or gouging) that cannot be easily achieved by torches with relatively symmetrical, non-angle-specific features.

SUMMARY OF THE INVENTION

The present invention provides means for attaching a consumable or a suite of multiple consumables (e.g., a cartridge) to a plasma arc torch to enable discreet asymmetrical positioning of the consumable(s) relative to a longitudinal axis of the torch. In some embodiments, these means include an interface or an intermediary attachment, such as an adapter, which can be used to locate the consumable(s) relative to the torch at a desired location or orientation. In some embodiments, these consumable(s) include asymmetric features that require the asymmetrical mounting in order to operate as desired. For example, these consumables can be configured to perform (i) flush cutting operations close to an internal corner of a workpiece and/or (ii) bevel cutting operations, while minimizing secondary finishing and avoid inflicting damage to any remaining portions of the workpiece. In addition, the asymmetrically oriented consumable(s) can ensure that the flush and bevel cuts are repeatable and reproducible. Generally, consumable(s) with asymmetric features can be used in many industrial applications, such as to perform flush cutting in a cargo trailer or ship hull having many internal compartments or bevel cutting on pipes.

In one aspect, a consumable set is provided that is usable in a plasma arc torch to direct a plasma arc to a processing surface of a workpiece. The consumable set includes a nozzle having: 1) a nozzle body defining a longitudinal axis extending therethrough, and 2) a nozzle exit orifice, disposed in the nozzle body, for constricting the plasma arc. The nozzle exit orifice defines an exit orifice axis oriented at a non-zero angle relative to the longitudinal axis. The consumable set also includes an alignment surface generally parallel to the exit orifice axis. The alignment surface is dimensioned to align the exit orifice such that the plasma arc impinges orthogonally on the processing surface.

In some embodiments, the alignment surface is configured to lay at least substantially flush against a guiding surface that is angled relative to the processing surface of the workpiece. The guiding surface can be a portion of a template attachable to the workpiece or the plasma arc torch. In some embodiments, the alignment surface is parallel to the exit orifice axis. The alignment surface can also be within about 10 degrees from being parallel to the exit orifice axis.

In some embodiments, the consumable set further includes a second alignment surface angled relative to the (first) alignment surface. The second alignment surface, in cooperation with the alignment surface, aligns the plasma arc to impinge orthogonally on the processing surface. The consumable set can also include a curved surface for interconnecting the alignment surface and the second alignment surface. The second alignment surface can be configured to contact the processing surface. At least one of the alignment surface or the second alignment surface can be located on an external surface of a nozzle.

In some embodiments, the consumable set includes a third alignment surface angled relative to the alignment surface and the second alignment surface. The third alignment surface, in cooperation with the alignment surface and the second alignment surface, aligns the plasma arc to impinge orthogonally on the processing surface. The third alignment surface can be configured to contact a second guiding surface angled relative to the guiding surface and the processing surface of the workpiece.

In some embodiments, the consumable set further includes a shield having at least one of the alignment surface, the second alignment surface or the third alignment surface.

In some embodiments, the alignment surface includes a rounded portion. The nozzle exit orifice can define an interior opening and an exterior opening along the exit orifice axis. For such a configuration, the distance from a first point on a geometric arc defined by the rounded portion of the alignment surface to the center of the exterior opening of the nozzle exit orifice is at least substantially equal to the distance from a second point on the geometric arc of the rounded portion of the alignment surface to the center of the exterior opening of the nozzle exit orifice. The center of the exterior opening of the nozzle exit orifice can be less than about 0.25 inches from the alignment surface. The exterior opening of the nozzle exit orifice can be located on the second alignment surface angled relative to the alignment surface.

In some embodiments, the nozzle exit orifice is curved or straight. In some embodiments, the nozzle or the alignment surface is coated with an electrically insulating material. In some embodiments, the plasma arc torch is a handheld plasma arc torch.

In another aspect, a nozzle for a plasma arc torch is provided. The nozzle includes a nozzle body having 1) a longitudinal axis extending through the nozzle body, 2) an internal structure generally rotationally symmetric about the longitudinal axis, and 3) an external structure rotationally asymmetric about the longitudinal axis. The nozzle includes an exit orifice that passes between the internal structure and the external structure of the nozzle body for constricting a plasma arc through the exit orifice. The exit orifice is rotationally asymmetric about the longitudinal axis. The nozzle also includes an alignment surface located on the external structure of the nozzle body for guiding the plasma arc to a location of a processing surface of a workpiece.

In some embodiments, the exit orifice of the nozzle defines an exit orifice axis generally parallel to the alignment surface. In some embodiments, the exit orifice axis is oriented at a non-zero angle relative to the longitudinal axis extending through the nozzle body.

In some embodiments, the nozzle further includes a second alignment surface located on the external structure of the nozzle body. The second alignment surface is adapted to contact the processing surface of the workpiece.

In some embodiments, the alignment surface of the nozzle is adapted to contact a guiding surface that guides the plasma arc to impinge on the processing surface. The processing surface of the workpiece can be relatively angled from the guiding surface. For example, the processing surface and the guiding surface can be perpendicular to each other and the plasma arc can impinge orthogonally on the processing surface. In some embodiments, the alignment surface includes a rounded portion.

In another aspect, a torch tip for a handheld plasma arc torch is provided. The torch tip includes a nozzle for generating a plasma arc. The nozzle can include a nozzle body. The torch tip further includes a plasma arc exit orifice located in the nozzle body for constricting the plasma arc. The plasma arc exit orifice defines an exit orifice axis. The torch tip also includes a first portion and a second portion segmented by a plane intersecting the exit orifice axis. The first portion has a smaller volume than the second portion. The torch tip further includes an alignment surface located on an outer surface of the first portion of the torch tip to guide the plasma arc to impinge orthogonally on a processing surface of a workpiece. The distance between the exit orifice axis and the alignment surface can be less than 0.5 inches, less than 0.25 inches or less than 0.125 inches.

In some embodiments, the exit orifice axis is located at a non-zero angle from a longitudinal axis extending through the nozzle body.

In some embodiments, the torch tip includes a second alignment surface located on an outer surface of the second portion of the torch tip. The second alignment surface is configured to contact the processing surface of the workpiece. In some embodiments, the first portion of the torch tip is about ⅓ or less of the volume of the second portion.

In another aspect, a method of manufacturing a consumable set is provided that is usable in a plasma arc torch for directing a plasma arc to a processing surface of a workpiece. The method includes fabricating a nozzle body having a longitudinal axis extending therethrough and forming a nozzle exit orifice in the nozzle body oriented at a non-zero angle relative to the longitudinal axis of the nozzle body. The nozzle exit orifice is dimensioned to constrict the plasma arc passing therethrough. The method further includes locating an alignment surface on the nozzle body that is generally parallel to the nozzle exit orifice axis. The alignment surface is dimensioned to align the plasma arc exiting the nozzle exit orifice to impinge orthogonally on the processing surface.

In some embodiments, the method further includes fabricating a shield including: 1) the alignment surface and 2) a shield exit orifice coplanar with the nozzle exit orifice for delivering the plasma arc to impinge on the processing surface of the workpiece.

Systems and methods of the present technology can consistently produce good quality bevel cuts, especially drag cutting over various distances. When making such bevel cuts, the torch does not have to be held at a fixed angle, thus reducing cut inconsistencies and the need for skilled operators, costly accessory tool(s) (e.g., mechanized tools) and/or secondary refinement work. These systems and methods also make possible the use of templates for making bevel cuts.

In another aspect, a consumable set is provided that is usable in a plasma arc torch to direct a plasma arc to a processing surface of a workpiece. The consumable set comprises a nozzle and an alignment surface. The nozzle includes: 1) a nozzle body defining a longitudinal axis extending therethrough, and 2) a nozzle exit orifice disposed in the nozzle body for constricting the plasma arc. The nozzle exit orifice defines an exit orifice axis oriented at a non-zero bevel angle relative to the longitudinal axis. The alignment surface is located on an external surface of the nozzle and is generally parallel to the longitudinal axis and substantially planar. The alignment surface is dimensioned to orient the nozzle exit orifice such that the plasma arc impinges on the processing surface of the workpiece at the bevel angle while the plasma arc torch is positioned substantially perpendicular to the processing surface.

In some embodiments, the consumable set includes a second alignment surface located on an external surface of the nozzle and substantially perpendicular to the alignment surface. The second alignment surface, in cooperation with the (first) alignment surface, aligns the plasma arc to impinge on the processing surface. The second alignment surface can be configured to contact the processing surface of the workpiece. For example, the second alignment surface can be oriented to lay substantially parallel over the processing surface of the workpiece perpendicular to the longitudinal axis. The consumable set can further include a curved external surface of the nozzle for interconnecting the alignment surface and the second alignment surface. In some embodiments, the consumable set further comprises a shield including at least one of the alignment surface or the second alignment surface.

In some embodiments, the alignment surface is configured to slidingly contact a guiding surface of a template, which is attachable to the workpiece or the plasma arc torch. For example, the alignment surface can lay at least substantially flush against the guiding surface of the template. The alignment surface can include a set of bearings coupled to the alignment surface to slidingly contact the guiding surface.

In some embodiments, the bevel angle is between about 20 and 60 degrees relative to the longitudinal axis. For example, the bevel angle can be about 22.5, 37.5 or 45 degrees relative to the longitudinal axis.

In some embodiments, the nozzle exit orifice defines an interior opening and an exterior opening along the exit orifice axis. The center of the exterior opening of the nozzle exit orifice can be less than about 0.25 inches from the alignment surface. The exterior opening of the nozzle exit orifice can be located on the second alignment surface.

In some embodiments, the nozzle or the alignment surface is coated with an electrically insulating material.

In some embodiments, the plasma arc torch is a handheld plasma arc torch.

In some embodiments, the alignment surface being generally parallel to the longitudinal axis comprises the alignment surface within about 10 degrees from being parallel to the longitudinal axis.

In another aspect, a method of manufacturing a consumable set is provided for a plasma arc torch capable of directing a plasma arc to a processing surface of a workpiece. The method includes fabricating a nozzle body having a longitudinal axis extending therethrough. The method also includes forming a nozzle exit orifice in the nozzle body oriented at a non-zero bevel angle relative to the longitudinal axis of the nozzle body. The nozzle exit orifice is dimensioned to constrict the plasma arc passing therethrough. The method further includes locating an alignment surface on the nozzle body, where the alignment surface is generally parallel to the longitudinal axis. The alignment surface is dimensioned to align the plasma arc exiting the nozzle exit orifice to impinge on the processing surface of the workpiece at the bevel angle while the plasma arc torch is oriented substantially perpendicular to the processing surface.

In some embodiments, the method further includes fabricating a shield including: 1) the alignment surface and 2) a shield exit orifice coplanar with the nozzle exit orifice for delivering the plasma arc to impinge on the processing surface. The method can further include fabricating the alignment surface to slidingly contact a guiding surface of a template.

The method can further include locating a second alignment surface on an external surface of the nozzle substantially perpendicular to the alignment surface. An exterior opening of the nozzle exit orifice can be located on the second alignment surface.

In some embodiments, the bevel angle is between about 20 and 60 degrees relative to the longitudinal axis.

In yet another aspect, a nozzle for a manual plasma arc torch is provided. The nozzle includes a nozzle body, an exit orifice, and a substantially planar alignment surface. The nozzle body includes 1) a longitudinal axis extending through the nozzle body, 2) an internal structure generally rotationally symmetrical about the longitudinal axis, and 2) an external structure disposed about the longitudinal axis. The exit orifice extends between the internal structure and the external structure of the nozzle body for constricting a plasma arc. The exit orifice is rotationally asymmetric about the longitudinal axis and defines an exit orifice axis at a non-zero bevel angle relative to the longitudinal axis. The alignment surface is located on the external structure of the nozzle body for orienting the exit orifice axis relative to a processing surface of a workpiece.

In some embodiments, the alignment surface is generally parallel to the longitudinal axis. In some embodiments, the alignment surface is adapted to contact a guiding surface of a template configured to guide the plasma arc to impinge on the processing surface of the workpiece. The processing surface and the guiding surface can be oriented substantially perpendicular relative to each other to cooperatively guide the plasma arc to impinge on the processing surface at the bevel angle.

In some embodiments, the nozzle further includes a second alignment surface located on the external structure of the nozzle body. The second alignment surface is adapted to contact the processing surface. The second alignment surface can be generally perpendicular to the longitudinal axis.

In yet another aspect, the nozzle and/or shield of the present invention is clocked (e.g., adjusted and then locked into position about other consumables and/or relative to the torch) between operations. For example, the nozzle and/or shield can have a set of predetermined orientations (e.g., 30 degree increments) to be clocked into such that these consumables are oriented at a specific angle relative to the torch (e.g., the torch handle, trigger, operator interface, etc.). The nozzle and/or shield can be asymmetric.

In some embodiments, a consumable set usable in a plasma arc torch is provided to direct a plasma arc to a processing surface of a workpiece. The plasma arc torch defines a torch body. The consumable set comprises a nozzle including: 1) a nozzle body defining a longitudinal axis extending therethrough, and 2) a nozzle exit orifice, disposed in the nozzle body, for constricting the plasma arc. The nozzle exit orifice defines an exit orifice axis oriented at a non-zero angle relative to the longitudinal axis. The consumable set also includes an alignment surface being dimensioned to align the exit orifice such that the plasma arc impinges at one of a beveled angle or an orthogonal angle on the processing surface of the workpiece. The alignment surface is configured to lay at least substantially flush against a guiding surface angled relative to the processing surface of the workpiece. The consumable set further includes a clocking element configured to attach the nozzle to the torch body while orienting the nozzle at a selected angle relative to the torch body to facilitate impingement at the beveled angle or the orthogonal angle.

In another aspect, a consumable set for a plasma arc torch is provided. The plasma arc torch and the consumable set define a longitudinal axis extending therethrough. The consumable set comprises a consumable tip configured to direct a plasma arc to a workpiece. The consumable tip is alignable along the longitudinal axis and comprises a plurality of consumable components, at least one of which includes an asymmetric feature asymmetrically disposed in the consumable tip relative to the longitudinal axis. The consumable set also includes a mounting element for coupling the consumable tip to a torch body. The mounting element is configured to axially secure the consumable tip relative to the torch body while permitting independent rotation of the consumable tip relative to the longitudinal axis during assembly. The independent rotation permits positioning of the consumable tip at a specific radial orientation relative to the longitudinal axis. The mounting element is also configured to both axially and radially fix the consumable tip with respect to the torch body such that the asymmetric feature is locked at the specific radial orientation relative to the longitudinal axis after securement.

In some embodiments, the plurality of consumable components of the consumable tip comprises a nozzle and a shield. The consumable tip can further comprise a locking element configured to radially affix at least two of the plurality of consumable components with respect to each other. The plurality of consumable components and the locking element can include complementary features configured to inter-fit with one another to orient the asymmetric feature. In some embodiments, the complementary features comprise a flat surface disposed on a circumferential section of each of the consumable components and the locking element. In some embodiments, each of the plurality of consumable components comprises an asymmetric feature asymmetrically disposed relative to the longitudinal axis, and the locking element maintains radial and axial alignment among the asymmetric features. In some embodiments, the nozzle comprises an asymmetric nozzle exit orifice and the shield comprises an asymmetric shield exit orifice, and the locking element is configured to maintain radial and axial alignment between the nozzle exit orifice and the shield exit orifice.

In some embodiments, the asymmetric feature defines an axis that is oriented at a non-zero angle relative to the longitudinal axis. In some embodiments, the asymmetric feature defines a cross section that is asymmetrical about the longitudinal axis.

In some embodiments, the consumable set further comprises a consumable body comprising at least an electrode and a plasma processing interface coupled to the torch body. The mounting element is configured to retain the consumable body and the consumable tip to the torch body via fixed engagement with the plasma processing interface to achieve the securement.

In some embodiments, the consumable set further comprises an ejector feature, connected to the mounting element, configured to disconnect the consumable body and the consumable tip from the plasma processing interface.

In some embodiments, the mounting element comprises a proximal end configured to fixedly engage the plasma processing interface after securement. In some embodiments, the mounting element is at least one of rotatable or translatable relative to the torch body and the consumable tip during assembly prior to the fixed engagement with the plasma processing interface.

In some embodiments, the fixed engagement of the mounting element with the plasma processing interface at the proximal end causes the mounting element to impart a frictional force on the consumable tip at a distal end of the mounting element, thereby causing the mounting element to fixedly engage the consumable tip at the distal end, such that the asymmetric feature of the consumable tip is locked at the specific radial orientation relative to the longitudinal axis after securement. In some embodiments, the fixed engagement of the mounting element with the plasma processing interface at the proximal end locks the consumable body in a specific radial orientation relative to the longitudinal axis.

In another aspect, a method for assembling at least a portion of a plasma arc torch is provided. The plasma arc torch defines a longitudinal axis extending therethrough. The method includes loosely engaging a proximal end of a mounting element to a torch body. A distal end of the mounting element axially secures a consumable tip while permitting independent rotation of the consumable tip relative to the mounting element. The consumable tip has a plurality of consumable components and at least one of the plurality of consumable components includes an asymmetric feature that is asymmetrically disposed in the consumable tip relative to the longitudinal axis. The method also includes orienting the consumable tip relative to the mounting element about the longitudinal axis to achieve a specific radial orientation of the asymmetric feature with respect to the longitudinal axis. The method further includes fixedly engaging the mounting element to the torch body. The fixed engagement imparts a frictional force between the mounting element and the consumable tip to both axially and radially secure the consumable tip to the torch body, such that the asymmetric feature of the torch tip is locked at the specific radial orientation relative to the longitudinal axis of the plasma arc torch after the fixed engagement.

In some embodiments, the method further includes assembling the consumable tip having the plurality of consumable components by fixedly locking the plurality of consumable components to each other. In some embodiments, assembling the consumable tip further comprises aligning and inter-fitting one or more complementary features of the plurality of consumable components with one another to orient the asymmetric feature. The plurality of consumable components of the consumable tip can comprise a nozzle and a shield.

In some embodiments, the method further includes connecting the consumable tip to the mounting element, such that the mounting element axially secures the consumable tip while permitting independent rotation of the consumable tip relative to the mounting element prior to the fixed engagement. In some embodiments, the method further includes rotating or translating the mounting element relative to the consumable tip or the torch body prior to the fixed engagement of the mounting body to the torch body.

In some embodiments, the fixed engagement of the mounting element to the torch body retains a consumable body and the consumable tip to the torch body. In some embodiments, the method further includes locking the consumable body to the torch body in a specific radial orientation relative to the longitudinal axis of the plasma arc torch upon fixedly engaging the mounting element to the torch body.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIGS. 2A and 2B show various perspectives of an exemplary nozzle configuration of FIG. 1.

FIG. 3 shows another perspective of the exemplary nozzle of FIGS. 2A and 2B.

FIG. 4 shows an exemplary alignment surface of the nozzle of FIGS. 2A and 2B.

FIGS. 5A-C show various perspectives of another exemplary nozzle configuration.

FIG. 6 shows another exemplary plasma arc torch for cutting a workpiece.

FIGS. 7A and 7B show various perspectives of an exemplary nozzle configuration of FIG. 6.

FIG. 8 shows another perspective of the exemplary nozzle of FIGS. 7A and 7B.

DETAILED DESCRIPTION OF THE INVENTION

Figure 1:
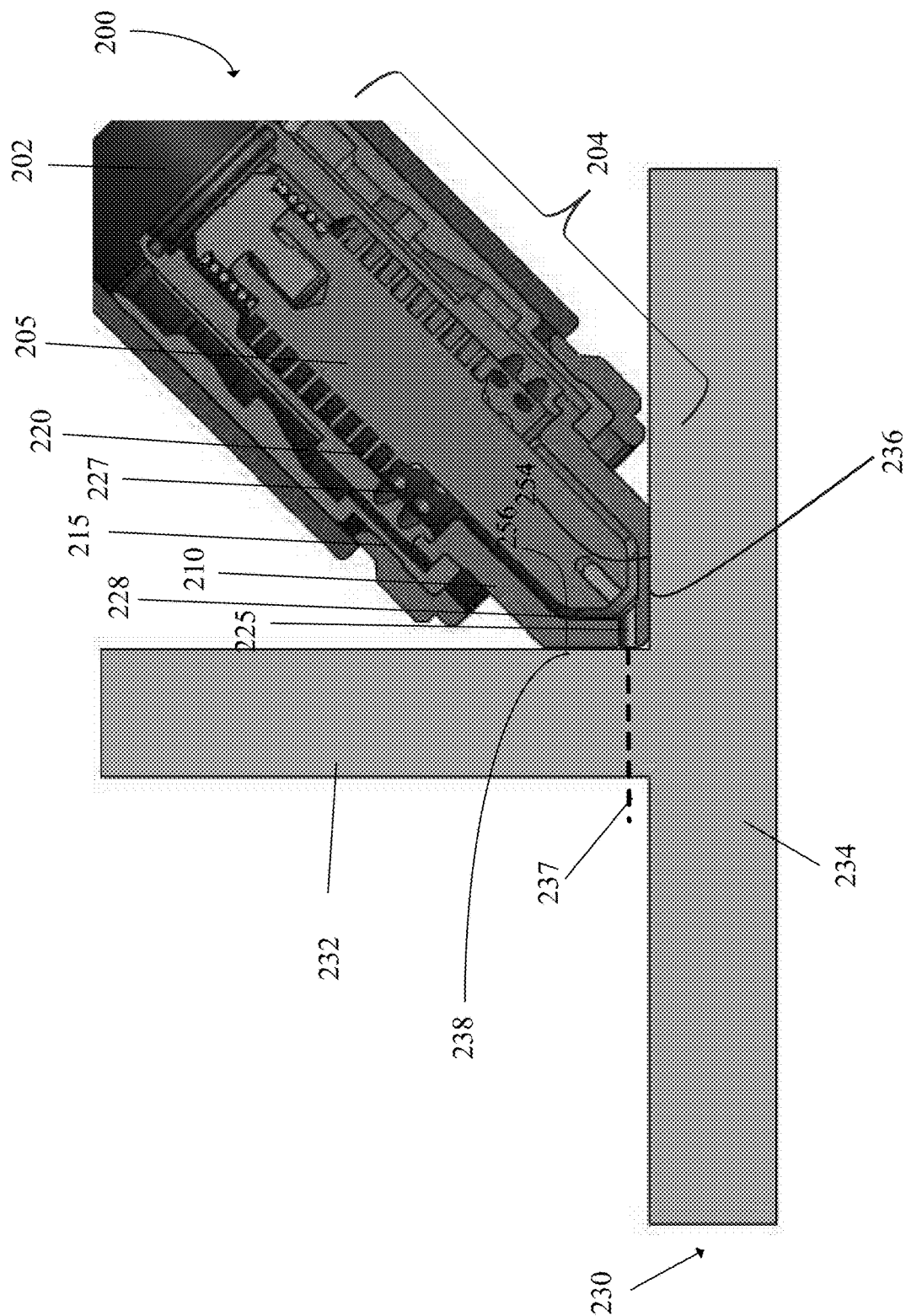
FIG. 1 shows an exemplary plasma arc torch for cutting a workpiece.

FIG. 1 shows an exemplary plasma arc torch 200 for cutting a workpiece according to some embodiments of the present technology. The plasma arc torch 200 includes a torch body 202 and a torch tip 204. The torch tip 204 includes multiple consumables, for example, an electrode 205, a nozzle 210, a retaining cap 215 and a swirl ring 220. The torch tip 204 can also include a shield (not shown). The torch body 202, which has a generally cylindrical shape, supports the electrode 205 and the nozzle 210. The nozzle 210 is spaced from the electrode 205 and has a central exit orifice 225 mounted within the torch body 202. The swirl ring 220 is mounted to the torch body 202 and has a set of radially offset or canted gas distribution holes 227 that impart a tangential velocity component to the plasma gas flow, causing the plasma gas flow to swirl. If a shield is present, the shield includes a shield exit orifice and is connected (e.g., threaded) to the retaining cap 215. The retaining cap 215 as shown is an inner retaining cap securely connected (e.g., threaded) to the torch body 202. In some embodiments, an outer retaining cap (not shown) is secured relative to the shield. The torch 200 can additionally include electrical connections, passages for cooling, passages for arc control fluids (e.g., plasma gas), and a power supply. In some embodiments, the consumables include a welding tip, which is a nozzle for passing an ignited welding gas.

In operation, a plasma gas flows through a gas inlet tube (not shown) and the gas distribution holes 227 in the swirl ring 220. From there, the plasma gas flows into a plasma chamber 228 and out of the torch 200 through the exit orifice 225 of the nozzle 210 that constricts the plasma gas flow. A pilot arc is first generated between the electrode 205 and the nozzle 210. The pilot arc ionizes the gas passing through the nozzle exit orifice 225. The arc then transfers from the nozzle 210 to a workpiece 230 for thermally processing (e.g., cutting or welding) the workpiece 230. In some embodiments, the nozzle 210 is suitably configured to be positioned as close as possible to an inner corner of the workpiece 230 created by a protruding flange 232 and a horizontal portion 234. The nozzle 210 can guide a plasma gas flow through the exit orifice 225 such that the plasma gas impinges orthogonally on the flange 232 as the plasma gas exits from the orifice 225, thereby cutting the flange 232 from the workpiece 230 along the path 237. It is noted that the illustrated details of the torch 200, including the arrangement of the components, the direction of gas and cooling fluid flows, and the electrical connections, can take a variety of forms. In addition, even though the flange 232 and the horizontal portion 234 of the inner corner are illustrated as being perpendicular to each other, the two portions of the workpiece 230 can be oriented at any angle and the nozzle 210 can be suitably configured to perform flush cutting in the resulting inner corner.

FIGS. 2A and 2B show various perspectives of an exemplary configuration of the nozzle 210 designed to facilitate inner-corner flush cutting operations. The nozzle 210 includes a nozzle body 250 defining a longitudinal axis A extending therethrough. An interior surface 252 of the nozzle 210 can be rotationally symmetrical about the longitudinal axis A while the exterior of the nozzle body 250 can be rotationally asymmetric about the longitudinal axis A. The nozzle exit orifice 225, disposed in the nozzle body 210, defines an exit orifice axis B extending longitudinally along the length of the nozzle exit orifice 225 from an interior opening 225b to an exterior opening 225a. The exit orifice axis B can be oriented at a non-zero angle relative to the longitudinal axis A. That is, the nozzle exit orifice 225 can be rotationally asymmetric about the longitudinal axis A. The nozzle exit orifice 225 is configured to introduce a plasma arc flow from the interior opening 225b, which is in fluid communication with the interior surface 252 of the nozzle 210, to a workpiece through the exterior opening 225a. Even though the nozzle exit orifice 225 is shown as being substantially straight, in other embodiments, the nozzle exit orifice 225 can be curved or have a sequence of non-parallel segments.

In addition, the nozzle 210 includes an alignment surface 254 disposed on the exterior surface of the nozzle body 250. The alignment surface 254 can be generally parallel to the exit orifice axis B, such as exactly parallel to the exit orifice axis B or within about 10 degrees from being parallel to the exit orifice axis B. During torch operation, the alignment surface 254 is dimensioned to lay substantially flush against a guiding surface 236 on the horizontal portion 234 of the workpiece 230, which is a surface that is not being cut by the plasma arc and is used instead to guide and/or position the torch for enhanced flush cutting of the flange 232. Specifically, the alignment surface 254 of the nozzle 210, upon being laid upon the guiding surface 236 of the horizontal portion 234, aligns the external end 225a of the nozzle exit orifice 225 against the processing surface 238 of the flange 232 such that a plasma arc impinges orthogonally onto the processing surface 238 and into the flange 232 along the cut path 237. In some embodiments, the longitudinal axis A of the nozzle body is oriented at an acute angle relative to the alignment surface 254, such as at a 60-degree angle relative to the alignment surface 254. As shown in FIG. 1, the processing surface 238 and the guiding surface 236 of the workpiece 230 are angled relative to each other to form the inner corner of the workpiece 230. Even though the guiding surface 236 is illustrated as a portion of the workpiece 234, in other embodiments, the guiding surface 236 is a portion of a separate template (not shown) used to guide the torch 200 into position. For example, the separate template, which includes the guiding surface 236, can be attached to the torch 200 and/or the workpiece 234 for positioning the torch 200 to perform flush cutting.

In some embodiments, a distance 260 between the center of the exterior opening 225a of the nozzle exit orifice 225 and the alignment surface 254 is less than or equal to about 0.5 inches, 0.25 inches, or 0.1 inches. This distance controls how close the cut path 237 is to the horizontal portion 234 of the workpiece 230. Hence, the smaller the distance 260, the closer the plasma arc torch cuts to the base of the flange 232 from the horizontal portion 234.

In addition to the (first) alignment surface 254, the nozzle 210 can also include a second alignment surface 256 angled relative to the alignment surface 254 and a curved surface 258 that interconnects the two alignment surfaces. During torch operation, the second alignment surface 256, in cooperation with the alignment surface 254, enhances orthogonal impingement of the plasma arc against the processing surface 238 of the flange 232. For example, the second alignment surface 256 can be oriented at an angle from the alignment surface 254 such that the second alignment surface 256 lays substantially flush against the processing surface 238 of the flange 232 while the alignment surface 254 lays substantially flush against the guiding surface 236 of the horizontal portion 234. In addition, the curved surface 258 of the nozzle 210 is configured to inter-fit within the corner created by the processing surface 238 and the guiding surface 236 of the workpiece 230. The two alignment surfaces of the nozzle 210 ensure that the plasma arc torch is positioned tightly and securely into the inner corner of the workpiece 230 while a plasma arc is delivered to the processing surface 238 by the torch 200 via the exterior opening 225a of the nozzle exit orifice 225. As shown in FIGS. 2A and B, the exterior opening 225a of the nozzle exit orifice 225 is located on the second alignment surface 256 of the nozzle 210.

In some embodiments, the first alignment surface 254 and the second alignment surface 256 are substantially perpendicular to each other such that the nozzle 210 can be securely positioned into an inner corner of about 90 degrees. In other embodiments, nozzles with different angles between the alignment surfaces (e.g., 60 degrees, 30 degrees and 15 degrees) can be constructed such that an operator can choose the most appropriate nozzle to perform flush cutting in view of the angle of a given inner corner. In some embodiments, the angle between the first alignment surface 254 and the second alignment surface 256 of a nozzle 210 is adjustable, such that the operator can adjust one or both of the alignment surfaces to produce a secure fit of the nozzle 210 into any given corner of a workpiece. For example, adjustments can be made such that both of the alignment surfaces of the nozzle 210 can contact respect processing surface 238 and guiding surface 236 of the workpiece 230 during a cutting operation.

Another approach for illustrating the asymmetric nature of the nozzle 210 is shown in FIG. 3. A plane can be defined to include the exit orifice axis B, thereby segmenting the nozzle 210 into two portions: 1) a first, smaller portion 280 on one side of plane and 2) a second, larger portion 282 on the other side of the plane. The alignment surface 254 of the nozzle 210 is located on the external surface of the first portion 280 and can contact the guiding surface 236 of the workpiece once the torch 200 is positioned into the inner corner of the workpiece. The second alignment surface 256 is located on the external surface of the second portion 282 and can contact the processing surface 238 of the workpiece during a cutting operation. The first portion 280 can be about ⅓, ¼, or ⅕ of the volume of the second portion 282.

In some embodiments, the contour of the alignment surface 254 of the nozzle 210 has at least a rounded-arc portion 268, as shown from a top view of the nozzle 210 in FIG. 4. The rounded-arc portion 268 can be positioned in an inner corner created by the intersection of a horizontal portion 234 and a flange 232 of a workpiece 230. The distance from a first point 270 on the rounded-arc portion 268 to the center of the exterior opening 225a of the nozzle exit orifice 255 is at least substantially equal to the distance from a second point 272 on the rounded-arc portion 268 to the center of the exterior opening 225a. The exterior opening 225a can be located on a second alignment surface 256 of the nozzle 210. Such equidistance configuration ensures that an operator of the plasma arc torch can predict the location on the workpiece to which a plasma arc would be delivered prior to initiating the plasma arc operation, thereby allowing the cutting operation to be repeatable and predictable. In some embodiments, the second alignment surface 256 is designed to include a similar rounded-arc portion.

FIGS. 5A-C show various perspectives of another exemplary nozzle 300 that includes three alignment surfaces. Specifically, the nozzle 300 includes i) a (first) alignment surface 302, ii) a second alignment surface 304 angled relative to the alignment surface 302, iii) a third alignment surface 306 angled relative to the alignment surface 302 and the second alignment surface 304; and iv) one or more curved surfaces 310 connecting the three alignment surfaces. The nozzle 300 is configured to perform flush cutting in relation to an inner corner of a workpiece 308 constructed from three surfaces, with the surface being cut referred to as the processing surface and the remaining two surfaces referred to as the guiding surfaces. In other embodiments, the guiding surfaces are disposed on one or more separate templates that are attachable to the workpiece 308 and/or the nozzle 300. In operation, the three alignment surfaces of the nozzle 300, in cooperation with each other, align the plasma arc to impinge orthogonally on the processing surface of the workpiece 308. For example, the alignment surfaces 302 and 304 can lay substantially flush against the two guiding surfaces of the workpiece 308 while the alignment surface 306, which includes the exterior opening 225a of the nozzle exit orifice 225, lays substantially flush against the processing surface of the workpiece 308. The alignment surfaces of the nozzle 300 ensure that the plasma arc torch is positioned tightly and securely into the inner corner of the workpiece 308 while a plasma arc is delivered to the processing surface of the workpiece 308 via the exterior opening 225a. In some embodiments, at least one of the alignment surface 302, the second alignment surface 304, or the third alignment surface 306 has a contour with a rounded-arc portion, similar to the contour illustrated in FIG. 4.

In various embodiments, the asymmetric design described with respect to FIGS. 1-5C can be introduced to a plasma arc torch that includes a shield. In some embodiments, the shield can include at least one of the alignment surface 254 or the second alignment surface 256 describe above with respect to the nozzle 210. In alternative embodiments, the shield can include at least one of the alignment surface 302, the second alignment surface 304, or the third alignment surface 306 describe above with respect to the nozzle 300. The asymmetric shield can further include a shield exit orifice coplanar with the nozzle exit orifice for delivering the plasma arc to impinge on a processing surface of a workpiece. The asymmetric shield, upon installation into a plasma arc torch, can provide similar functions as the asymmetric nozzle 210 or 300, such as allowing an operator to securely and tightly position the torch into an inner corner of a workpiece created by two or three workpiece surfaces, while the torch delivers a plasma arc flow to one of the workpiece surfaces. In some embodiments, the contour of at least one of the alignment surfaces of the asymmetric shield has a rounded-arc portion, similar to the contour illustrated in FIG. 4.

In another aspect, a plasma arc torch with a nozzle is provided for making a bevel cut on a workpiece. The torch can remain perpendicular (e.g., at a fixed 90 degree angle) to the workpiece during the cut operation. Hence, the bevel feature is provided by the nozzle itself, rather than the angularity of the torch. A template can be provided to guide the torch, which is useful in situations where an operator desires to make the bevel cut at a consistent angle over a distance. The plasma arc torch of the present technology can improve the quality of bevel cuts, thereby decreasing the need for secondary processing work or accessories.

FIG. 6 shows an exemplary plasma arc torch for cutting a workpiece at a bevel angle, according to some embodiments of the present technology. The plasma arc torch 400 includes a torch body 402 and a torch tip 404. The torch tip 404 includes multiple consumables, for example, an electrode 405, a nozzle 410, a retaining cap 415 and a swirl ring 420. The torch tip 404 can also include a shield (not shown). The function and configuration of many components of the torch 400, including the electrode 405, retaining cap 415 and swirl ring 420, can be substantially similar to the counterpart components of the plasma torch 200 of FIG. 1.

As shown in FIG. 6, the nozzle 410 is mounted within the torch body 402 in a spaced relationship from the electrode 405. The nozzle 410 has a body defining a longitudinal axis 446 extending therethrough and an exit orifice 425. In operation, a plasma gas flows out of the torch 400 through the exit orifice 425 configured to constrict the plasma gas flow. A pilot arc is first generated between the electrode 405 and the nozzle 410. The pilot arc ionizes the gas passing through the nozzle exit orifice 425. The arc then transfers from the nozzle 410 to a workpiece 430 for thermally processing (e.g., cutting) the workpiece 430. In some embodiments, the nozzle 410 is suitably configured to allow the torch 400 to be positioned substantially perpendicular to a processing surface 438 of the workpiece 430, where the processing surface 438 is defined as a substantially flat surface on the workpiece 430 on which the plasma arc delivered by the torch 400 makes the initial contact. Specifically, the nozzle 410 can guide a plasma gas flow through the exit orifice 425 such that the plasma gas impinges on the processing surface 438 at a bevel angle 444 relative to the longitudinal axis 446 of the nozzle 410, while the torch 400 remains substantially perpendicular to the processing surface 438. This operation cuts the workpiece 430 into two pieces along the path 437. In some embodiments, a template 432 is used to guide and/or position the torch 400 for enhanced bevel cutting of the workpiece 430, especially over a distance along a lengthwise direction 433 of the workpiece 430.

FIGS. 7A and 7B show various perspectives of an exemplary configuration of the nozzle 410 designed to facilitate bevel cutting. The nozzle 410 includes a nozzle body 450 defining the longitudinal axis 446 extending therethrough. An interior surface 452 of the nozzle 410 can be rotationally symmetrical about the longitudinal axis 446. The nozzle exit orifice 425, disposed in the nozzle body 450, defines an exit orifice axis 447 extending longitudinally along the length of the nozzle exit orifice 425 from an interior opening 425b to an exterior opening 425a. The exit orifice axis 447 can be oriented at a non-zero bevel angle 444 relative to the longitudinal axis 446. That is, the nozzle exit orifice 425 can be rotationally asymmetric about the longitudinal axis 446. The non-zero bevel angle 444 can be between about 0 degree and ±90 degrees relative to the longitudinal axis 446, such as between about 20 and about 60 degrees relative to the longitudinal axis 446. An exemplary bevel angle 444 can be 22.5, 37.5 or 45 degrees. The nozzle exit orifice 425 is configured to introduce a plasma arc flow from the interior opening 425b, which is in fluid communication with the interior surface 452 of the nozzle 410, to a workpiece through the exterior opening 425a to cut the workpiece at the non-zero bevel angle 444. Even though the nozzle exit orifice 425 is shown as being substantially straight, in other embodiments, the nozzle exit orifice 425 can be curved or have a sequence of non-parallel segments.

In addition, the nozzle 410 includes an alignment surface 454 disposed on the exterior surface of the nozzle body 450. The alignment surface 454 can be generally parallel to the longitudinal axis 446, such as exactly parallel to the longitudinal axis 446 or within about 10 degrees from being parallel to the longitudinal axis 446. The alignment surface 454 can be substantially planar. In some embodiments, a distance 460 between the center of the exterior opening 425a of the nozzle exit orifice 425 and the alignment surface 454 is less than or equal to about 0.5 inches, 0.25 inches, or 0.1 inches.

During an exemplary torch operation, the alignment surface 454 is dimensioned to slidingly contact (e.g., lay substantially flush against) a guiding surface 436 on the template 432, which is a surface used to guide and/or position the torch 400 for more precise bevel cutting of the workpiece 430, as shown in FIG. 6. Specifically, the alignment surface 454 of the nozzle 410, upon contacting (e.g., being laid flush against) the guiding surface 436 of the template 432, is adapted to orient the plasma arc torch 400 substantially perpendicular to the processing surface 438 of the workpiece 430 such that the external opening 425a of the nozzle exit orifice 425 is aligned against the processing surface 438 of the workpiece 430 to introduce a plasma arc that impinges onto the processing surface 438 at the bevel angle 444 along the cut path 437.

In some embodiments, the guiding surface 436 of the template 432 extends along the lengthwise direction 433 for a specific distance such that an operator can slide the torch 400 against the guiding surface 436 in the lengthwise direction 433 to make a bevel cut at a consistent angle over the distance. In some embodiments, the guiding surface 436 of the template 432 and/or the alignment surface 454 of the torch 400 include a set of bearings (not shown) to facilitate the sliding contact between the two surfaces, such as to reduce the amount of friction between the two surfaces. The template 432 can be attached to or integrally constructed with/from workpiece 430 or the torch 400. The template 432 can also be a separate, stand-alone component.

In addition to the (first) alignment surface 454, the nozzle 410 can also include a second alignment surface 456 substantially perpendicular to the alignment surface 454 and a curved surface 458 that interconnects the two alignment surfaces. In some embodiments, the curved surface 458 is absent and the alignment surfaces 454, 456 are perpendicularly connected to each other. During torch operation, the second alignment surface 456, in cooperation with the alignment surface 454, enhances impingement of the plasma arc against the processing surface 438 of the workpiece 430 at the bevel angle 444. For example, the second alignment surface 456 can be oriented perpendicular to the alignment surface 454 such that the second alignment surface 456 contacts the processing surface 438 of the workpiece 430 while the alignment surface 454 contacts the guiding surface 436 of the template 432. The second alignment surface 456 can lay substantially flush against (i.e., parallel to) the processing surface 438 and substantially perpendicular to the longitudinal axis 446 of the nozzle 410. The two alignment surfaces of the nozzle 410 ensure that the plasma arc torch 400 is positioned substantially perpendicularly against the processing surface 438 of the workpiece 430 while a plasma arc is delivered to the processing surface 238 by the torch 400 via the exterior opening 425a of the nozzle exit orifice 425 at the bevel angle 444. As shown in FIG. 7A, the exterior opening 425a of the nozzle exit orifice 425 is located on the second alignment surface 456 of the nozzle 410.

In some embodiments, the contour of the second alignment surface 456 of the nozzle 410 is asymmetric, including at least a rounded-arc portion 468 and a straight portion 470, as shown from a top view of the nozzle 410 in FIG. 8. The straight portion 470 can be located on a side of the second alignment surface 456 close to the alignment surface 454. In operation, the straight portion 470 can be positioned substantially parallel to the guiding surface 436 of the template 432 so as to be guided by the template 432 during cutting. The nozzle exit orifice 225 can be angled such that the plasma arc path 437 is directed toward the straight portion 370 (i.e., the alignment surface 454) as the plasma arc exits the exterior opening 425a located on the second alignment surface 456. In some embodiments, the exterior opening 425a is located off-centered on the second alignment surface 456 (i.e., closer to the straight portion 470 than to the rounded-arc portion 468). This off-centered feature allows the plasma arc to be more easily imparted at a bevel angle closer to the straight portion 470. In contrast, the interior opening 425b (as shown in FIG. 7A) can be centered relative to the nozzle body 450 so as to align with the hafnium insert 406 in the electrode 405. In some embodiments, the use of the template 432 is optional. When the second alignment surface 456 allows the plasma arc torch 400 to be more easily and securely positioned perpendicular to the processing surface 438 of the workpiece 430, the template 432 may not be needed, especially if the distance of the bevel cut in the lengthwise direction 433 is relatively short.

Figure 9:
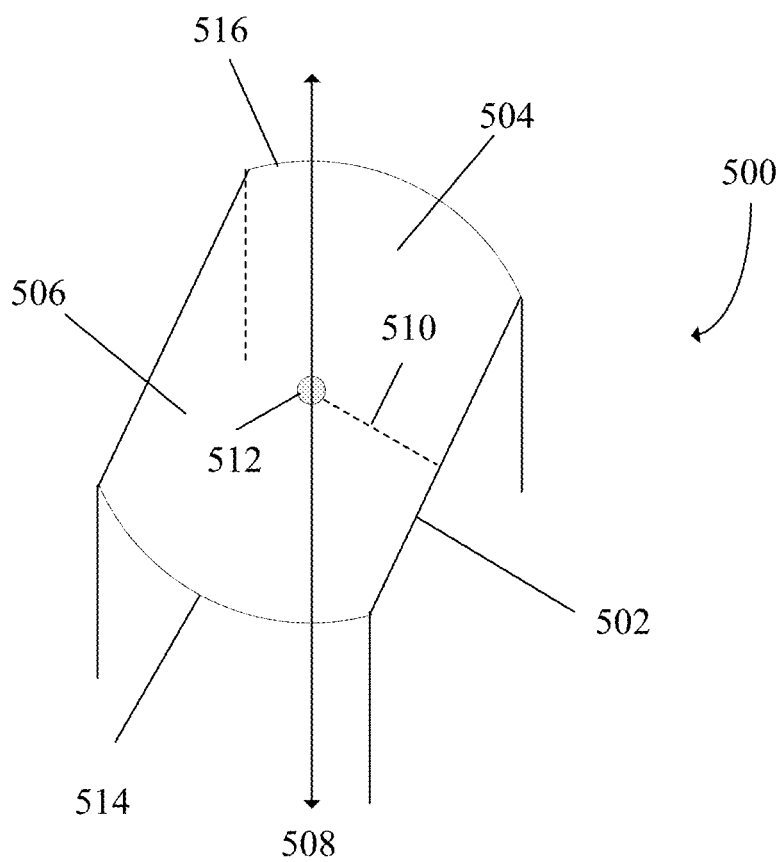
FIG. 9 shows another exemplary nozzle configuration.

FIG. 9 shows another exemplary nozzle 500 that includes three alignment surfaces. Specifically, the nozzle 500 includes i) a (first) planar alignment surface 502, ii) a second planar alignment surface 504 oriented substantially perpendicular to the alignment surface 502 and adapted to contact the processing surface 438 of the workpiece 430 during torch operation, iii) a third planar alignment surface 506 that is oriented substantially perpendicularly to the second alignment surface 504 and substantially parallel to the alignment surface 502, and iv) two arced surfaces 514 and 516. The planar alignment surface 502 functions similar to the alignment surface 454 of the nozzle 410. Specifically, the alignment surface 502 is configured to slidingly contact a first template (not shown) to position the torch while a plasma arc is directed along a cut path 510 toward the alignment surface 502. The second alignment surface 504 functions substantially similar to the second alignment surface 456 of the nozzle 410. Specifically, it is configured to contact the processing surface 438 of the workpiece 430, so as to lay substantially parallel over the workpiece 430 perpendicular to a longitudinal axis 508 of the nozzle 500, while the plasma arc is delivered via an exterior opening 512 located on the second alignment surface 504. The contour of the second alignment surface 504 can be substantially symmetrical. The third alignment surface 506 is configured to slidingly contact a second template (not shown) for positioning the torch while the plasma arc is directed along the cut path 510 away from the third alignment surface 506. In operation, the three alignment surfaces of the nozzle 500, in cooperation with each other, align the plasma arc to impinge on the processing surface of the workpiece at a bevel angle. For example, the alignment surfaces 502 and 506 can lay substantially flush against two templates while the alignment surface 504, which includes the exterior opening 512 of the nozzle exit orifice, lays substantially flush against the processing surface of the workpiece. The alignment surfaces of the nozzle 500 ensure that the plasma arc torch is positioned substantially perpendicularly to the workpiece while a plasma arc is delivered to the processing surface via the exterior opening 512.

In some embodiments, an operator uses both the first and second templates to achieve precise positioning of the nozzle 500 as he makes a cut on the workpiece along the lengthwise direction. The first and second templates can be attached to each other such that they can be positioned around the nozzle simultaneously. In some embodiments, only one template is used, in cooperation with either the alignment surface 502 or the second alignment surface 506, to guide the plasma arc to impinge toward or away from the template. For example, the operator can use only the first template positioned against the alignment surface 502 to guide the nozzle 500 as it cuts in the lengthwise direction toward the template. In some embodiments, the operator uses only the second template positioned against the alignment surface 506 to guide to nozzle 500 as it cuts in the lengthwise direction away from the second template. In some embodiments, the operator does not use a template when making a bevel, especially if the cut distance in the lengthwise direction is short.

In various embodiments, different nozzles can be used to make bevel cuts of different angles, where each nozzle includes a nozzle exit orifice oriented at a different angle in relation to the longitudinal axis of the nozzle body. For example, a kit of nozzle consumables can be provided that includes nozzles for making bevel cuts at 22.5, 37.5.45 degrees, etc. The kit can also include nozzles having different numbers of guiding surfaces. Furthermore one or more templates can be included in the kit compatible with different nozzle shapes. Hence, an operator can change the nozzle as needed to achieve the desired cut angle and cut distance.

In various embodiments, the features described with respect to FIGS. 6-9 can be introduced to a plasma arc torch that includes a shield. In some embodiments, the shield can include at least one of the alignment surface 454 or the second alignment surface 456 described above with respect to the nozzle 410. In alternative embodiments, the shield can include at least one of the alignment surface 502, the second alignment surface 504, or the third alignment surface 506 described above with respect to the nozzle 500. The shield can further include a shield exit orifice coplanar with the nozzle exit orifice for delivering the plasma arc to impinge on a processing surface of a workpiece. The shield, upon installation into a plasma arc torch, can provide similar functions as the nozzle 410 or 500, such as allowing an operator to maintain the torch at a perpendicular position relative to a processing surface of a workpiece while the torch delivers a plasma arc flow to the processing surface at a bevel angle and over a cutting distance.

In various embodiments, the nozzles and/or shields of the present technology can be coated with an electrically insulating material, such as a ceramic coating. The plasma arc torches, including the nozzles and/or shields, can be constructed as handheld devices or wearable devices attached to a backpack, front-pack, and/or a shoulder strap mounted pack, for example. In addition, the nozzles and/or shields of the present technology can be used in mechanized applications, such as incorporated in X-Y cutting tables, in which case extraneous templates may not be required. For example, if the nozzle 410 or 500 is incorporated in a mechanized torch system to make bevel cuts, no complex equipment is required to manipulate to the torch and no sophisticated software is needed to perform motion control.

In another aspect, the present invention features means for attaching one or more consumables to a plasma arc torch to achieve specific radial orientations of the consumable(s) with respect to a longitudinal axis of the torch. These consumables can include one or more asymmetric features that provide specialized cutting or gouging functions if the consumables are maintained at the desired radial orientations during torch operation. For example, one or more interfaces can be provided to radially affix the asymmetric nozzle 210 of FIG. 1 to the torch body to facilitate a flush cutting operation at a desired radial orientation of the asymmetric nozzle 210. Other asymmetric features that can be enabled through specific radial orientations of consumable components include gas connections, data connections, power/electrical connections, positioning, fixturing, and/or automation features, spring mechanism for contact starting a torch, plasma processing/performance features (e.g., plasma bore, guide surface, cutting process, gouging process, washing process, severing via a plenum, bore configuration, or counter-bore configurations, etc.) and/or safety interlocking features.

Figure 10:
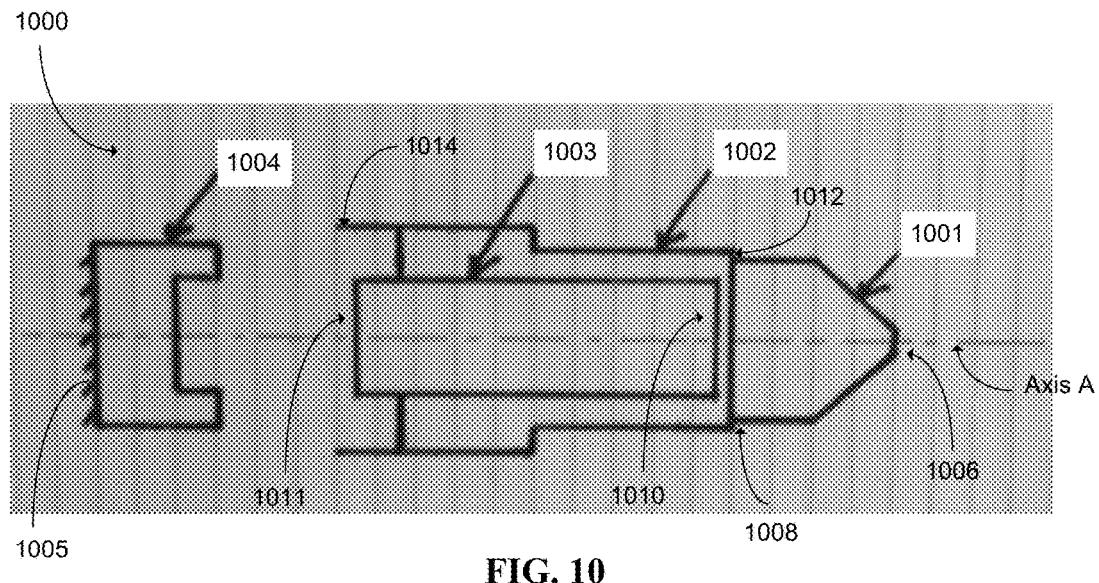
FIG. 10 generally depicts an exemplary consumable set of a plasma arc torch with multiple interfaces configured to couple consumables at specific radial orientations to support asymmetric torch features.
Figure 11:
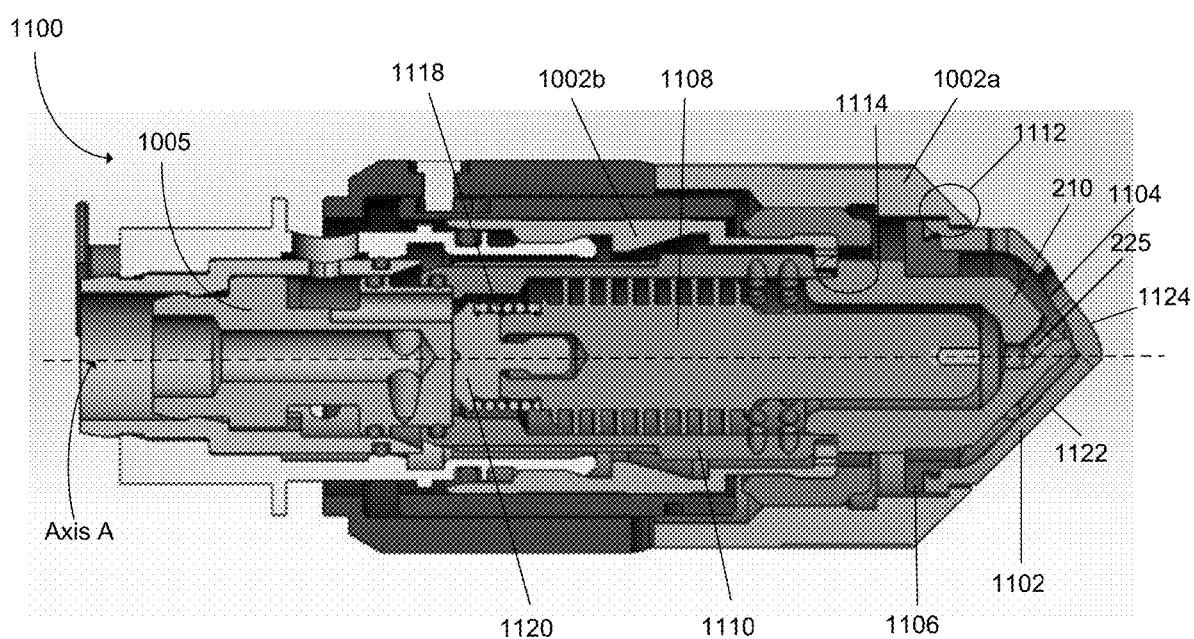
FIG. 11 shows an exemplary plasma arc torch comprising the elements of FIG. 10 for orienting asymmetric torch features.

FIG. 10 generally depicts an exemplary consumable set 1000 of a plasma arc torch with multiple interfaces configured to couple consumables at specific radial orientations to support asymmetric torch features. FIG. 11 shows an exemplary plasma arc torch 1100 comprising the elements of FIG. 10 for orienting asymmetric torch features. As shown in FIG. 10, the consumable set includes a consumable tip 1001, a mounting element 1002, a main consumable body 1003, and a plasma processing interface 1004. The consumable set 1000 can be coupled to a torch body 1005 to enable torch operations, where the torch body 1005 and the consumable set define a central longitudinal axis A extending therethrough. In some embodiments, the consumable set 1000 is a multi-piece system with the consumable tip 1001, the mounting element 1002 and the main consumable body 1003 individually serviceable and replaceable. In some embodiments, two or more of the consumable tip 1001, the mounting element 1002 and the main consumable body 1003 form a consumable cartridge that is replaced or serviced as a unitary structure.

As shown, the consumable tip 1001 generally defines a proximal end 1008 and a distal end 1006, where the distal end 1006 is the end along the longitudinal axis A that is maintained closest to a workpiece (not shown) during torch operation and the proximal end 1008 is opposite of the distal end 1006 along the longitudinal axis A. The proximal end 1008 of the consumable tip 1001 is adapted to be retained against the distal end 1010 of the main consumable body 1003 via the mounting element 1002. In addition, the consumable tip 1000 can be aligned along the longitudinal axis A when mounted to the main consumable body 1003. In some embodiments, the consumable tip 1001 includes one or more consumable components configured to direct a plasma arc to a workpiece to process the workpiece. Further, at least one of the consumable components of the consumable tip 1001 includes an asymmetric feature that is asymmetrically disposed relative to the longitudinal axis A when the consumable tip 1001 is mounted to the main consumable body 1003. Various embodiments of the consumable tip 1001 are described below in relation to FIGS. 11, 15 and 17.

For example, as shown in FIG. 11, the consumable tip 1001 can comprise the asymmetric nozzle 210 of FIG. 1 for flush cutting close to an internal corner of a workpiece, as described above. In this case, the nozzle exit orifice 225 of the nozzle 210 is an asymmetric feature as it is oriented at a non-zero angle relative to the longitudinal axis A when the nozzle 210 is connected to the torch body 1005. Alternatively, the consumable tip 1001 comprises the asymmetric nozzle 410 of FIG. 6 for beveled cutting, as described above. In some embodiments, the consumable tip 1001 additionally includes a shield that may or may not have an asymmetric feature. For example, as shown in FIG. 11, the shield 1102 has an asymmetric shield exit orifice 1104 configured to deliver a plasma arc from the nozzle 210 to the workpiece in a flush cutting operation. In some embodiments of the consumable tip 1001, a locking element 1106 is employed to radially affix at least two of the consumable components of the consumable tip 1001 with respect to each other while permitting the asymmetric feature(s) to be radially and/or axially aligned. For example, as shown in FIG. 11, the locking element 1106 can couple the shield 1102 to the nozzle 210 such that the shield exit orifice 1104 is radially and axially aligned with the nozzle exit orifice 225 upon assembly of the consumable tip 1001. The locking element 1106 also locks together the consumable components at the aligned position to enable the consumable tip 1001 to move (e.g., rotate or translate) as a unitary structure. Details regarding the consumable tip 1001 of FIG. 11 are provided below with reference to FIG. 15. An alternative design of the consumable tip 1001 is described below with reference to FIGS. 16a and 16b.

In some embodiments, the mounting element 1002 is a retaining element comprising an inner retaining cap 1002a and an outer retaining cap 1002b, as shown in FIG. 11. The mounting element 1002 includes a substantially hollow body and defines a distal end 1012 and a proximal end 1014, as shown in FIG. 10. The hollow body of the mounting element 1002 is configured to house at least a portion of the main consumable body 1003, which can include at least one of an electrode 1108, a swirl ring 1110 or a contact element 1120 plus a resilient element 1118 (e.g., a spring), both of which are a part of a contact starting mechanism of the plasma arc torch 1100. The distal end 1012 of the mounting element 1002 is configured to engage the consumable tip 1001. The proximal end 1014 of the mounting element 1002 is configured to engage the torch body 1005 via the plasma processing interface 1004. The hollow body of the mounting element 1002 between the proximal end 1014 and the distal end 1012 is configured to house at least a portion of the main consumable body 1003. Thus, the mounting element 1002 can retain the consumable tip 1001 and/or the main consumable body 1003 against the torch body 1005 to enable torch operations.

The mounting element 1002 at its proximal end 1014 can fixedly engage the plasma processing interface 1004 by threading, for example. The fixed engagement between the mounting element 1002 and the plasma processing interface 1004 also locks the main consumable body 1003 and/or the consumable tip 1001 to the torch body 1005 at a specific radial orientation relative to the longitudinal axis A. In some embodiments, the mounting element 1002 first loosely engages (e.g., loosely threads into) the plasma processing interface 1004 to permit an operator to adjust and orient (i) the main consumable body 1003 to a desired radial orientation relative to the torch body 1005 and/or (ii) the consumable tip 1001 to another desired radial orientation relative to the torch body 1005. Then, the mounting element 1002 can be fixedly engaged to the plasma processing interface 1004 (e.g., by tightening the threads) to lock the main consumable body 1003 and/or the consumable tip 1001 in place at the adjusted radial orientations. Thus, in some embodiments, the mounting element 1002 is rotatable about and/or translatable along the longitudinal axis A to enable its threading to the plasma processing interface 1004.

After loosely engaging but prior to fixedly engaging the proximal end 1014 of the mounting element 1002 to the torch body 1005 via the plasma processing interface 1004, at least two of the mounting element 1002, the main consumable body 1003 and the consumable tip 1001 are rotatable relative to each other and to the torch body 1005. For example, the consumable tip 1001 can rotate independent of the main consumable body 1003 and/or the mounting element 1002 such that the consumable tip 1001 can be positioned at a specific radial orientation relative to the torch body 1005, thereby orienting an asymmetric feature in the consumable tip 1001 (e.g., a nozzle bore, a drag surface, shield gas holes, etc.) at the desired radial orientation without disturbing the other components. As another example, the main consumable body 1003 can rotate independent of the mounting element 1002 and/or the consumable tip 1001 prior to the fixed engagement such that the main consumable body 1003 can be positioned at a specific radial orientation relative to the torch body 1005 in order to support certain asymmetric electrical, fluid and data connections. Generally, such relative movement of the elements in the consumable set 1000 prior to the fixed engagement allows independent adjustments of the elements to enable desired radial positioning of one or more asymmetric features about the longitudinal axis A prior to torch operation.

As described above, the distal end 1012 of the mounting element 1002 is configured to engage the proximal end 1008 of the consumable tip 1001. For example, as shown in FIG. 11, the proximal end 1008 of the consumable tip 1001 can be generally sandwiched between the outer retaining cap 1002*a* and the inner retaining cap 1002*b*. Prior to the mounting element 1002 being fixedly engaged to the plasma processing interface 1004 at the proximal end 1014 (i.e., during loose engagement), the mounting element 1002 can longitudinally constrain (i.e., axially secure) the consumable tip 1001 relative to the main consumable body 1003 while permitting independent rotation of the consumable tip 1001 relative to the mounting element 1002. Such rotatable engagement and axial securement can be accomplished by one of crimping, snap fitting, frictional fitting, threading, grooves, etc.

In some embodiments, the rotatable engagement and axial securement between the mounting element 1002 and the consumable tip 1001 occurs at (i) the interface 1112 between an outer surface of the shield 1102 of the consumable tip 1001 and an inner surface of the outer retaining cap 1002*a*, and/or (ii) the interface 1114 between a proximal surface of the nozzle 210 of the consumable tip 1001 and a distal surface of the inner retaining cap 1002*b*. For example, the shield 1102 can include an engagement feature, such as a groove or step, circumferentially disposed on an outer surface that allows a distal tip of the outer retaining cap 1002*a* to frictionally fit into the groove or step. Similarly, the nozzle 210 can include an engagement feature, such as a groove or step, circumferentially disposed at a proximal surface that allows a distal tip of the inner retaining cap 1002*b* to abut against the groove or step. In some embodiments, to attach the consumable tip 1001 to the mounting element 1002, the consumable tip 1001 is pushed into the distal opening of the mounting element 1002 (i.e., the distal opening defined by the outer retaining cap 1002*a*) until the proximal surface of the nozzle 210 of the consumable tip 1001 physically contacts the distal surface of the inner retaining cap 1002*b* to form the interface 1114, at which position further axial advancement of the consumable tip 1001 within the mounting element 1002 is hindered. Also, at this position, the distal end of the outer retaining cap 1002*a* rotatably engages the proximal end of the shield 1102 of the consumable tip to form the interface 1112.

In some embodiments, the proximal end 1014 of the mounting element 1002, such as the proximal end of the outer retaining cap 1002*a*, can fixedly engage the plasma processing interface 1004 that is coupled to the torch body 1005. Such fixed engagement can be achieved through full threading of the mounting element 1002 relative to the torch body 1005, for example. This securement causes the mounting element 1002 to impart a frictional force on the consumable tip 1001 via at least one of the interface 1112 or interface 1114 at the distal end 1012 of the mounting element 1002, thereby causing the mounting element 1002 to clamp down on the consumable tip 1001 to fixedly engage the consumable tip 1001 at a particular radial orientation about the longitudinal axis A. The fixed engagement of the mounting element 1002 with the consumable tip 1001 thus locks an asymmetric feature (e.g., the nozzle exit orifice 225 and/or the shield exit orifice 1104) of the consumable tip 1001 at a specific radial orientation such that a first alignment surface 1122 and/or a second alignment surface 1126 disposed on an external surface of the shield 1104 can fit into a corner of a workpiece to perform flush cutting. The alignment surface 1122, 1126 can be substantially similar to the alignment surfaces 254, 256, respectively, of the asymmetric nozzle 210 of FIG. 1.

As described above, during the loose engagement between the mounting element 1002 and the plasma processing interface 1004, an operator can adjust the radial orientation of the consumable tip 1001 about the longitudinal axis A such that it is locked at a desired radial orientation after fixed engagement between the mounting element 1002 and the plasma processing interface 1004. In some embodiments, the exterior surfaces of the consumable components in the consumable tip 1001 (e.g., the shield 1102 at the interface 1112 and/or the nozzle 210 at the interface 1114) are relatively smooth, such that an operator can freely rotate the consumable tip 1001 to achieve any desired radial orientation prior to the fixed engagement. In some embodiments, the consumable components of the consumable tip 1001 have a set of predetermined orientations (e.g., at 30 degree increments), which may be clocked into by the mounting element 1002 prior to the fixed engagement. These fixed positions can be implemented by a variety of mechanical means such as detents and/or magnets on an exterior surface of the consumable tip 1001 and complementary features on a surface of the mounting element 1002 (or vice versa). In one embodiment where detents are used, the detents allow the consumable tip 1001 to settle into a predetermined specific radial orientation (e.g., 90 degrees) relative to a torch handle. In some embodiments, the mechanical means (e.g., detents) can be located relative to a threading arrangement between the mounting element 1002 and the consumable tip 1001 to achieve a substantially accurate/predetermined radial relationship between the consumable tip 1001 and the mounting element 1002.

In some embodiments, the mounting element 1002 is fixedly attached to the consumable body 1003, such that the consumable body 1003 rotates and translates with the mounting element 1002 during both loose engagement and fixed engagement as the mounting element 1002 is threaded to the plasma processing interface 1004. In this case, the consumable body 1003 can be substantially symmetrical about the longitudinal axis A so that the consumable body 1003 does not need to be positioned and clocked at a specific radial orientation relative to the torch body 1005. For example, the consumable body 1003 of FIG. 11, which includes the contact element 1120, the resilient element 1118, the electrode 1108, and the swirl ring 1110, is substantially symmetrical about the longitudinal axis A and does not need to be oriented at any particular radial position relative to the torch body 1005 to support torch operations.

In some embodiments, the consumable body 1003 is rotatable independent of the mounting element 1002 and/or the consumable tip 1001 during the loose engagement between the mounting element 1002 and the plasma processing interface 1004. Therefore, an operator can adjust the radial orientation of the consumable body 1003 about the longitudinal axis A such that it is positioned at a desired radial orientation with respect to the plasma processing interface 1004 prior to being locked into place by the fixed engagement between the mounting element 1002 and the plasma processing interface 1004. Specifically, the fixed engagement between the mounting element 1002 and the plasma processing interface 1004 can impart a frictional force between the mounting element 1002 and the consumable body 1003 to lock the consumable body 1003 in place both radially and axially relative to the plasma processing interface 1004. In this case, the consumable body 1003 may have one or more asymmetric features with respect to the longitudinal axis A that require the specific radial orientation in order to achieve a desired alignment with the processing interface 1004. In turn, the plasma processing interface 1004 can define an asymmetric geometry configured to receive and mate with the consumable body 1003 at the specific radial orientation. For example, clocking of the plasma processing interface 1004 with the proximal end 1011 of the consumable body 1003 at a predefined radial orientation can enable alignment of various data, electrical, liquid coolant, and gas channels between the torch body 1005 and the consumable body 1003 via the plasma processing interface 1004. In some embodiments, the plasma processing interface 1004 is fixedly attached to the torch body 1005, such as integrally formed with the torch body 1005.

Figure 12:
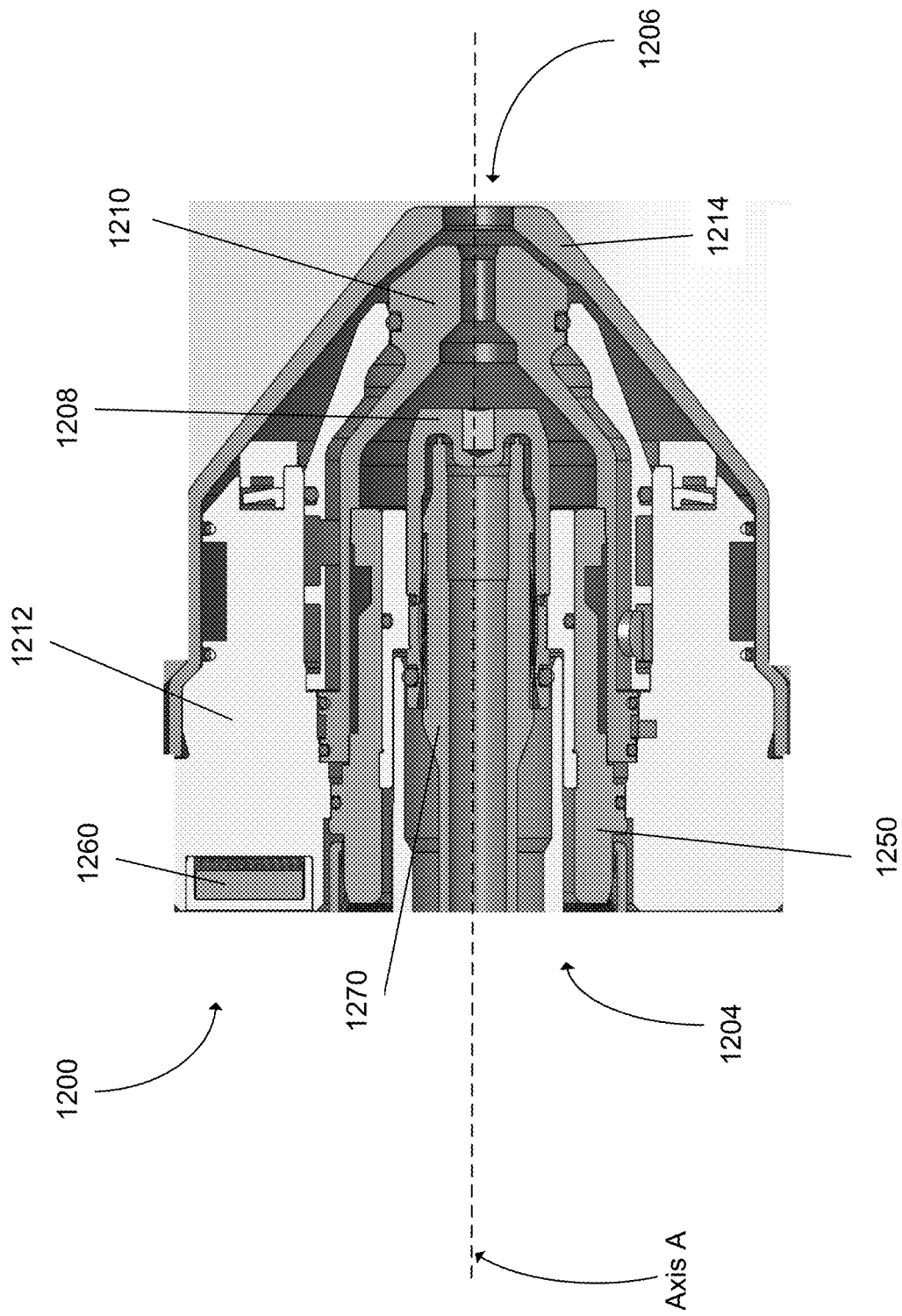
FIG. 12 shows a sectional view of an exemplary consumable cartridge with asymmetric features that require clocked radial orientation relative to the plasma processing interface of FIG. 10.

FIG. 12 shows a sectional view of an exemplary consumable cartridge 1200 with asymmetric features that require clocked radial orientation relative to the plasma processing interface 1004 that is coupled to the torch body 1005 of FIG. 10. The consumable cartridge 1200 essentially encapsulates the mounting element 1002, the main consumable body 1003 and the consumable tip 1001 in one unitary structure. The consumable cartridge 1200 can be substantially the same as the cartridge 104 described in U.S. Ser. No. 15/228,708, which is assigned to Hypertherm, Inc. of Hanover, N.H., the disclosure of which is hereby incorporated by reference in its entirety. The cartridge 1200 is attachable to the torch body 1005 via the plasma processing interface 1004. The cartridge 1200 generally defines a proximal end 1204 and a distal end 1206 along the central longitudinal axis A of the torch body 1005. As shown, the cartridge 1200 includes a cartridge frame 1212 coupled to one or more of an electrode 1208, a nozzle 1210, a swirl ring 1250, and a shield 1214 disposed concentrically about the central longitudinal axis A. Even though the nozzle 1210 and the shield 1214 of FIG. 12 do not include an asymmetric feature, in other embodiments, at least one of the nozzle 1210 or the shield 1214 includes an asymmetric feature, such as the asymmetric nozzle exit orifice of FIG. 15 or FIGS. 16*a* and 16*b* and/or the asymmetric shield exit orifice of FIG. 15. In these asymmetric embodiments, as in the embodiments of FIGS. 10 and 11 described above, these asymmetric features at the distal end 1206 of the consumable cartridge 1200 may be clocked as described above to radially orient the consumable tip 1001 relative to the longitudinal axis A as desired regardless of the clocking requirement of the proximal end 1204 of consumable cartridge 1200.

Figure 13:
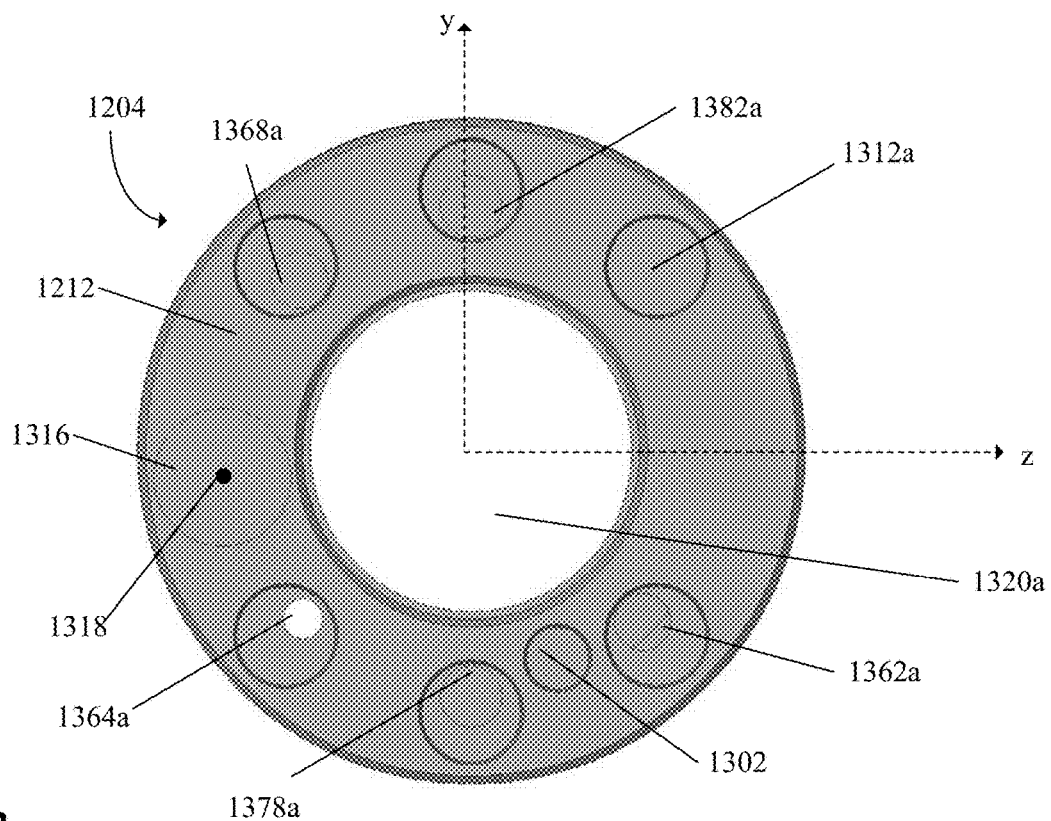
FIG. 13 shows a view of the proximal end of the cartridge frame of the cartridge of FIG. 12.
Figure 14:
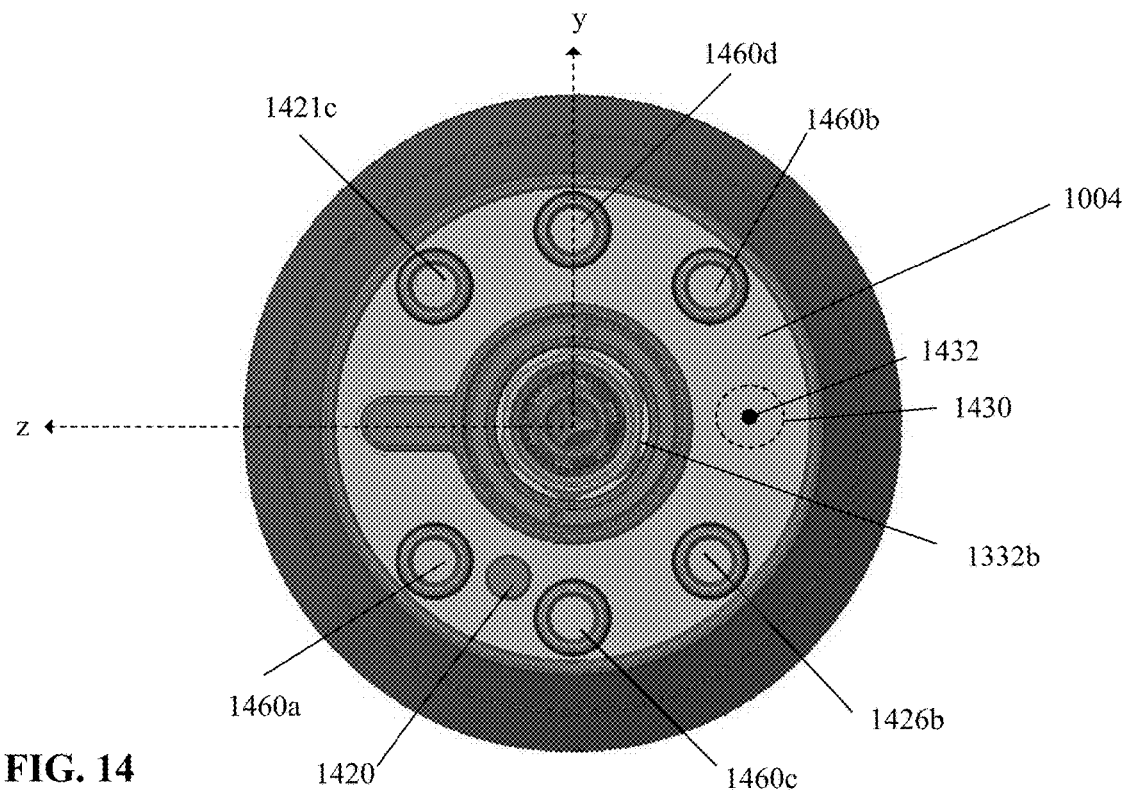
FIG. 14 shows an exemplary design of the plasma processing interface of FIG. 10 that includes various electrical, gas and liquid openings corresponding to the openings at the proximal end of the cartridge frame of FIG. 13.

The cartridge frame 1212 is adapted to physically interface with the plasma processing interface 1004, thereby connecting the cartridge 1200 to the torch body 1005. FIG. 13 shows a view of the proximal end 1204 of the cartridge frame 1212 of the cartridge 1200 of FIG. 12. The proximal end 1204 of the cartridge frame 1212 can include a clocking feature (e.g., a pin cavity) 1302 that can interact with a corresponding clocking feature of the plasm processing interface 1004 to connect the torch body 1005 to the cartridge 1200. Such an interface allows alignment of various electrical, liquid coolant, and gas channels between the torch body 1005 and the cartridge 1200, thereby maintaining one or more predefined electrical, liquid coolant and gas flow paths across the torch system. FIG. 14 shows an exemplary design of the plasma processing interface 1004 that includes various electrical, gas and liquid openings corresponding to the openings at the proximal end 1204 of the cartridge frame 1212 of FIG. 13, as well as a clocking feature 1420 (e.g., a pin) adapted to interact with the clocking feature 1320 of the proximal end 1204 of the cartridge frame 1212 to align the two components at a predetermined radial orientation.

With respect to the continuity of gas flows between the torch body 1005 and the cartridge 1200, in the predetermined radial orientation, a shield gas opening 1426*b* on the plasma processing interface 1004 is aligned with a shield gas opening 1364*a* at the proximal end 1204 of the cartridge frame 1212 to fluidly connect a shield gas channel segment (not shown) of the torch body 1005 with a shield gas channel (not shown) of the cartridge frame 1212 to deliver a shield gas flow from the torch body 1005 to the cartridge 1200. In the same predetermined radial orientation, a plasma gas opening 1421*c* on the plasma processing interface 1004 is aligned with a plasma gas proximal opening 1312*a* at the proximal end 1204 of the cartridge frame 1212 to fluidly connect a plasma gas channel (not shown) of the torch body 1005 with a plasma gas channel (not shown) of the cartridge frame 1212 to deliver a plasma gas from the torch body 1005 to the cartridge 1200.

With respect to the continuity of coolant flow between the torch body 1005 and the cartridge 1200, upon clocking of the plasma processing interface 1004 with the cartridge frame 1212 in the predetermined radial orientation, a first liquid coolant channel opening 1460*a* on the plasma processing interface 1004 is aligned with a first coolant channel opening 1362a at the proximal end 1204 of the cartridge frame 1212 to fluidly connect a first liquid coolant channel (not shown) of the torch body 1005 with a first liquid coolant channel (not shown) of the cartridge frame 1212, thereby allow a liquid coolant to be delivered from the torch body 1005 to the cartridge 1200. In the same predetermined radial orientation, a second liquid coolant channel opening 1460b on the plasma processing interface 1004 is aligned with a second coolant channel opening 1368a at the proximal end 1204 of the cartridge frame 1212 to fluidly connect a second coolant channel (not shown) of the torch body 1005 with a second coolant channel (not shown) of the cartridge frame 1212 to return a liquid coolant flow from the cartridge 1200 to the torch body 1005. In the same predetermined radial orientation, a third liquid coolant channel opening 1460c on the plasma processing interface 1004 is aligned with a third coolant channel opening 1378a at the proximal end 1204 of the cartridge frame 1212 to fluidly connect a third coolant channel (not shown) of the torch body 1005 with a third coolant channel (not shown) of the cartridge frame 1212 to again deliver a liquid coolant flow from the torch body 1005 to the cartridge 1200. In the same predetermined radial orientation, a fourth liquid coolant channel opening 1460d on the plasma processing interface 1004 is aligned with a fourth coolant channel opening 1382a of the cartridge frame 1212 to fluidly connect a fourth coolant channel (not shown) of the torch body 1005 with a fourth coolant channel (not shown) of the cartridge frame 1212 to again return a liquid coolant flow from the cartridge 1200 to the torch body 1005.

With respect to data communication between the torch body 1005 and the cartridge 1200, in the predetermined radial orientation enabled by the clocking features 1420, 1302, a reader device, such as an RFID reader device, of the torch body 1005 (not shown) is rotationally aligned with a signal device 1260, such as an RFID tag, of the cartridge 1200 (shown in FIG. 12). For example, an antenna coil embedded in the torch body 1005 can map to an area 1430 at the plasma processing interface 1004 with a center 1432 that substantially aligns with a center 1318 of an area 1316 at the proximal end 1204 of the cartridge frame 1212, which maps to the signal device 1260 embedded in the cartridge 1200. Such radial alignment between the centers 1432, 1318 reduces communication interference between the reader device and the signal device 1260 to facilitate data communication across the torch system.

With respect to the continuity of electrical connections between the torch body 1005 and the cartridge 1200, upon interfacing the plasma processing interface 1004 with the cartridge frame 1212, a central opening 1332b of the plasma processing interface 1004 is adapted to align with a central opening 1320a at the proximal end 1204 of the cartridge frame 1212 to connect a main channel (not shown) of the torch body 1005 with a main channel (not shown) of the cartridge frame 1212. A conductive coolant tube 1270 is adapted to be inserted into the connected main channels across the torch body 1005 and the cartridge frame 1212. In some embodiments, a pilot arc current and/or a transferred arc current from a power supply (not shown) is routed from the torch body 1005, through the coolant tube 1270, and to the electrode 1208 of the cartridge 1200.

FIGS. 13 and 14 are merely illustrative of a particular arrangement of gas, fluid, electrical, and data communication connections across the plasma processing interface 1004 and the proximal end 1204 of the cartridge frame 1212. Other layouts of one or more of these connections are also within the scope of the present invention. Generally, one or more of these connections can be arranged in a variety of geometries and locations on the plasma processing interface 1004 and correspondingly on the proximal end 1204 of the cartridge frame 1212 to facilitate electrical, data, gas and liquid circulation across a plasma arc torch.

In some embodiments, the plasma processing interface 1004 of the torch body 1005 includes an ejector feature that mechanically ejects the consumable body 1003 (or the cartridge 1200) if the consumable body 1003 (or the cartridge 1200) is not properly positioned or aligned with the torch body 1005.

As described above with reference to FIG. 10, the consumable tip 1001 of the consumable set 1000 of FIG. 10 generally includes one or more consumable components, with at least one of the consumable components having an asymmetric feature. In some embodiments, an asymmetric feature can define an axis that is oriented at a non-zero angle relative to the central longitudinal axis A (when the consumable tip 1001 is connected to the main consumable body 1003). In some embodiments, an asymmetric feature defines an axis that is offset from the central longitudinal axis A. In some embodiments, an asymmetric feature defines an asymmetric cross section about the central longitudinal axis A.

Figure 15:
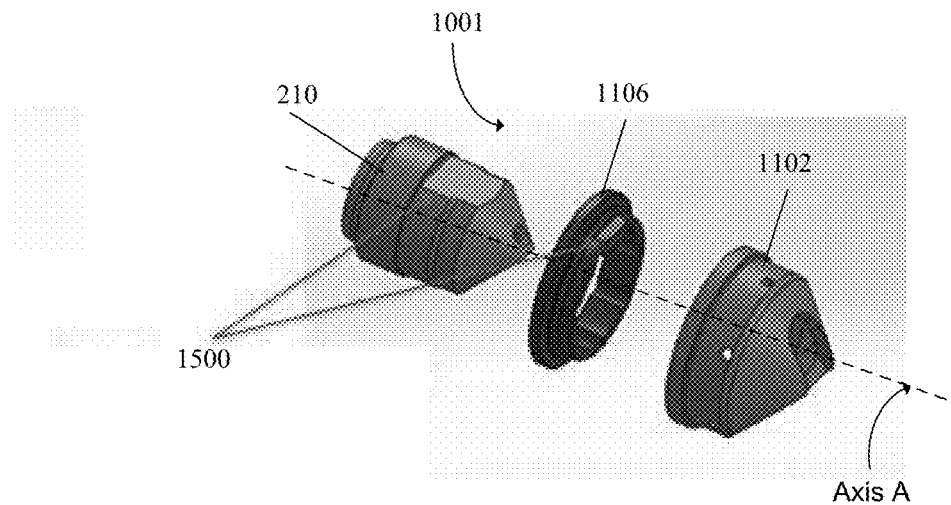
FIG. 15 shows an exemplary design of the consumable tip of FIG. 10 that is implemented in the plasma arc torch of FIG. 11.

FIG. 15 shows an exemplary design of the consumable tip 1001 of FIG. 10 that is implemented in the plasma arc torch 1100 of FIG. 11. As shown, the consumable tip 1001 includes the nozzle 210, which is described above in detail with respect to FIG. 1 for performing flush cutting operations. The nozzle 210 includes an asymmetric nozzle exit orifice 225 (shown in FIG. 11) with an axis that is oriented at a non-zero angle (e.g., an acute angle) relative to the central longitudinal axis A. The consumable tip 1001 also includes the shield 1102 having an asymmetric shield exit orifice 1104 (shown in FIG. 11) with an axis that is oriented relative to the central longitudinal axis A at about the same non-zero angle as the nozzle exit orifice 225. The consumable tip 1001 further includes the locking element 1106 that is adapted to be positioned between the nozzle 210 and the shield 1102 to fixedly couple the two consumable components together while radially and/or axially aligning the asymmetric nozzle exit orifice 225 with the asymmetric shield exit orifice 1104. To achieve such alignment, the consumable components of the consumable tip 1001 (e.g., the nozzle 210 and the shield 1102) as well as the locking element 1106 can include complementary features configured to inter-fit with one another only when the asymmetric features of the consumable components are radially and/or axially aligned. For example, as shown in FIG. 15, the complementary features comprise a flat surface 1500 disposed on a corresponding circumferential section of each of the consumable components and the locking element 1106. To properly assemble the nozzle 210, the shield 1102 and the locking element 1106, the flat surfaces 1500 of these components need to be aligned, which also radially and axially align the nozzle exit orifice 225 with the shield exit orifice 1104. The locking element 1106 is further configured to lock the consumable components at the aligned position (e.g., via interference fit) such that the consumable tip 1001 moves (e.g., rotates or translates) as a unitary component.

Figure 16A:
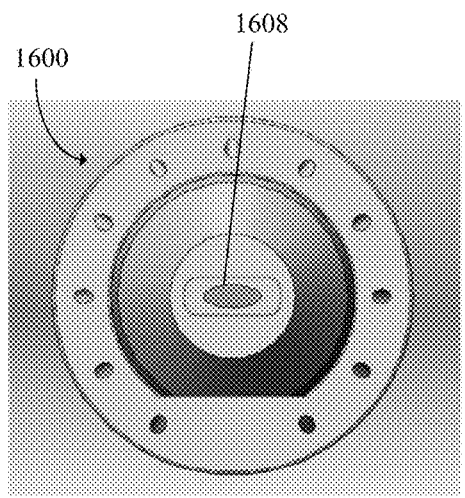
FIGS. 16a and b show a top view and a cut-away view, respectively, of an exemplary asymmetric nozzle that can be used as the consumable tip of FIG. 10 to perform either a cutting or gouging operation.
Figure 16B:
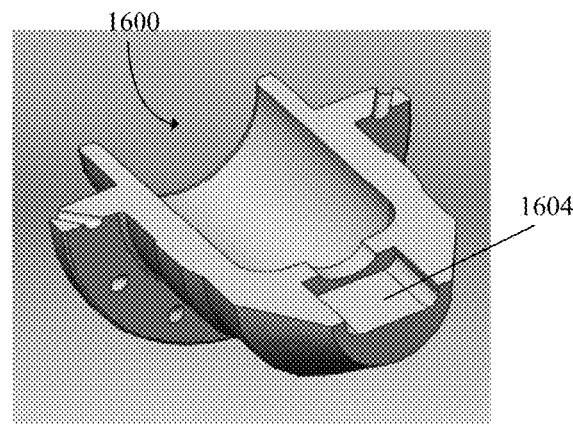

In another exemplary design of the consumable tip 1001 of FIG. 10, the consumable tip 1001 includes an asymmetric nozzle that can be used to cut a workpiece or gouge a workpiece depending on the radial orientation of the asymmetric nozzle bore relative to the longitudinal axis A. FIGS. 16a and b show a top view and a cut-away view, respectively, of an exemplary asymmetric nozzle 1600 that can be used as the consumable tip 1001 of FIG. 10 to perform either a cutting or gouging operation.

As shown, the nozzle 1600 has a nozzle exit orifice 1604 with an asymmetrically-shaped (e.g., elliptical) cross section 1608 about the longitudinal axis A. To perform a cutting operation, the major axis of the elliptical cross section 1608 of the nozzle exit orifice 1604 is in the direction of the cut (e.g., direction of travel of the torch) such that a prolonged arc is produced for the cutting operation. To perform a gouging operation, the major axis of the elliptical cross section 1608 of the nozzle exit orifice 1604 is perpendicular to the direction of the gouge such that a dispersed arc is produced for the gouging operation. In some embodiments, the consumable tip 1001 also includes a shield that does not have an asymmetric feature (i.e., is substantially symmetrically about the longitudinal axis A). In some embodiments, the consumable tip 1001 is assembled such that asymmetric nozzle 1600 and the symmetrical shield are locked together to form a unitary structure. Prior to torch operation, an operator can rotate the consumable tip 1001 to a particular radial orientation about the longitudinal axis A that is independent of the positions of the other elements the consumable set 1000 and lock that particular radial orientation of the consumable tip 1001 in place. This allows the operator to control the orientation of the elliptical cross section 1608 of the nozzle exit orifice 1604 relative to the torch based on whether the operator wants to perform a cutting or gouging operation. In some embodiments, a consumable tip design incorporating the nozzle 1600 can be implemented in the plasma arc torch 1100 of FIG. 11 in place of the flush-cutting consumable tip. This consumable tip design can also be implemented in the cartridge 1200 of FIG. 12 in place of the substantially symmetrical consumable tip.

Figure 17:
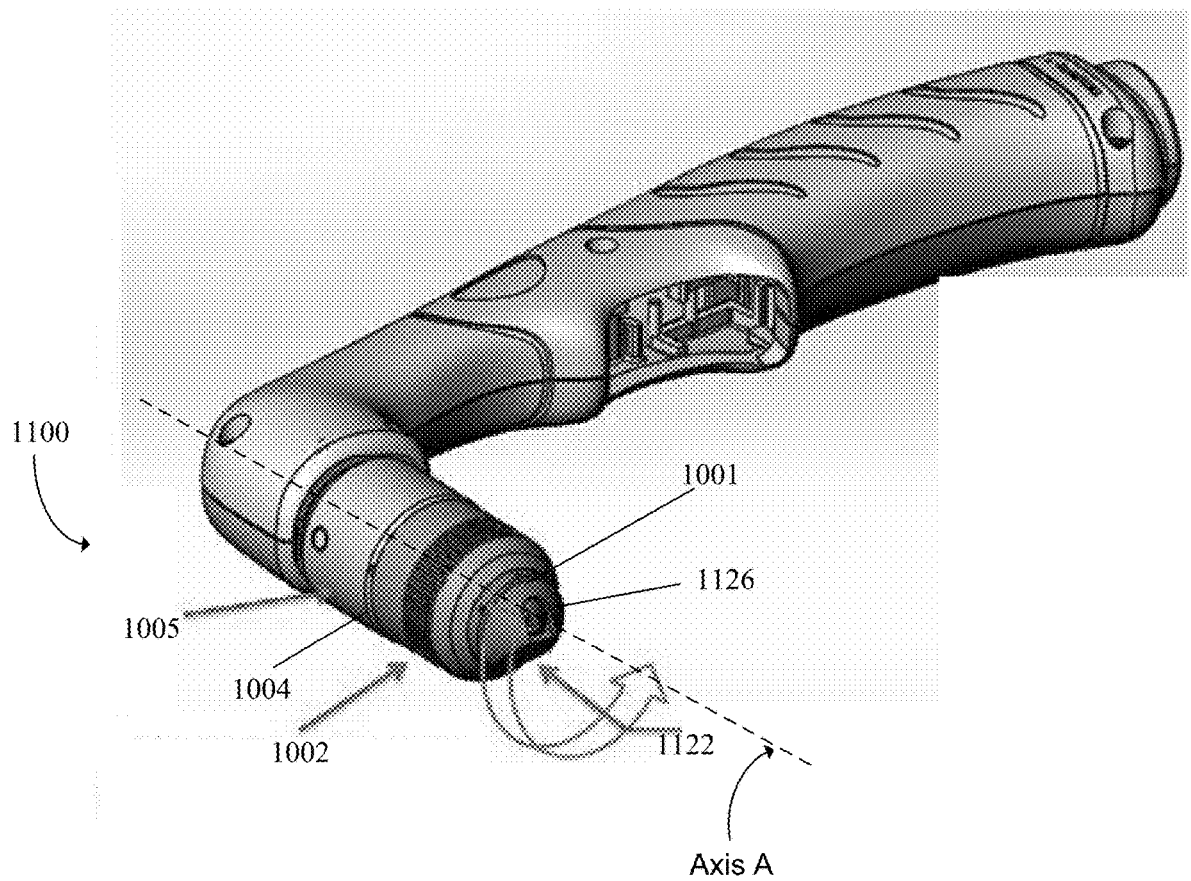
FIG. 17 shows an isometric view of the plasma arc torch of FIG. 11 fully assembled.

FIG. 17 shows an isometric view of the plasma arc torch 1100 of FIG. 11 fully assembled. As described above, the consumable tip 1001 comprises the nozzle 210 coupled to and aligned with the shield 1102 such that the nozzle exit orifice 225 and the shield exit orifice 1104 are radially affixed to each other. The consumable tip 1001 forms a unitary structure, where the nozzle 210 and the shield 1102 rotate together as a single unit. The consumable tip 1001 is independently rotatable about the longitudinal axis A prior to the fixed engagement of the mounting element 1002 to the torch body 1005 via the plasma processing interface 1004. This allows an operator to orient the consumable tip 1001 such that its asymmetric feature (e.g., the nozzle exit orifice 225 and/or the shield exit orifice 1104) is at a specific radial orientation about the longitudinal axis A, thereby permitting the first alignment surface 1122 and/or the second alignment surface 1126 of the shield 1104 to also rotate to a position such that they can fit into a corner of a workpiece to perform flush cutting. In some embodiments, prior to the fixed engagement, the main consumable body 1003 is also independently rotatable about the longitudinal axis A (as indicated by the arrow) such that it can be clocked into a predetermined radial orientation with the plasma processing interface 1004 in order to maintain certain electrical, data, gas and/or liquid connections between the torch body 1005 and the consumable set 1000. Fixed engagement between the mounting element 1004 and the torch body 1005 via the plasma processing interface 1004 allows the various radial orientations of the elements in the consumable set 1000 to be locked into place during torch operation.

Figure 18:
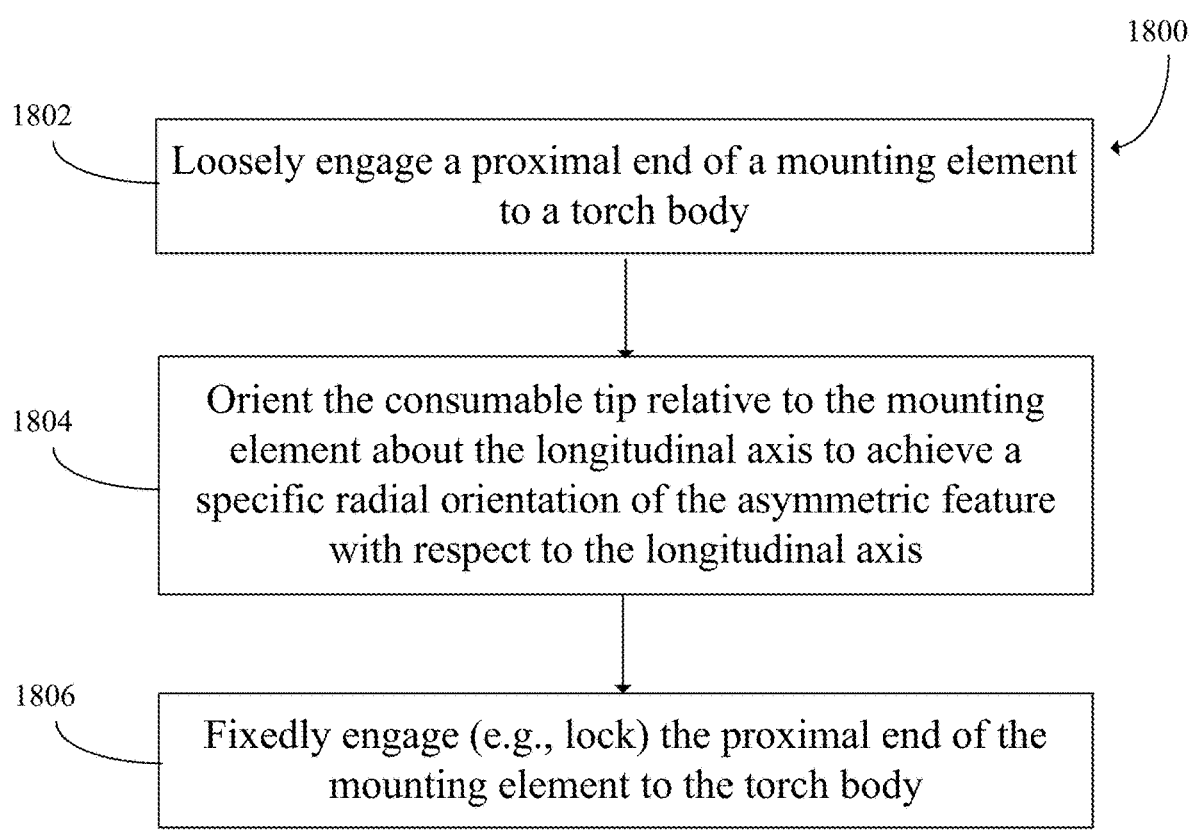
FIG. 18 shows an exemplary process for assembling the consumable set of FIG. 10 to a torch body.

FIG. 18 shows an exemplary process 1800 for assembling the consumable set 1000 of FIG. 10 to a torch body. As described above, the consumable set 1000 can be encapsulated in a cartridge or comprise multiple separate pieces. The process 1800 includes loosely engaging the proximal end 1014 of the mounting element 1002 to the plasma processing interface 1004 by, for example, threading (step 1802). For example, the loose engagement can be achieved by partial threading (e.g., threading 80% from being fully threaded), so that the mounting element 1002 is only loosely connected to the plasma processing interface 1004. After the loose engagement, the distal end 1012 of the mounting element 1002 axially secures the consumable tip 1001 while permitting independent rotation of the consumable tip 1001 about the longitudinal axis A relative to the mounting element 1002. The consumable tip 1001 includes multiple consumable components, where at least one consumable component has an asymmetric feature that is asymmetrically disposed in the consumable tip 1001 relative to the longitudinal axis A. For example, the consumable tip 1001 can be implemented (i) as the design of FIG. 15 for flush cutting or (ii) include the asymmetric nozzle 1600 of FIG. 16 for selectively performing a cutting or gouging operation.

In some embodiments, if the consumable set 1000 is a cartridge, the mounting element 1002, the main consumable body 1003 and/or the consumable tip 1001 are already assembled together prior to the loose engagement, but these elements are rotatably coupled relative to each other such that they can rotate independently about the longitudinal axis A. In some embodiments, if the consumable set 1000 comprises multiple separate elements, the process 1800 also includes, prior to the loose engagement, assembling the consumable tip 1001 by fixedly locking the multiple consumable components of the consumable tip 1001 together using, for example, the locking element 1106. The locking of the consumable components in the consumable tip 1001 is adapted to axially and radially align the one or more asymmetric features in the consumable tip 1001 while enabling the consumable tip 1001 to function as a unitary structure. In addition, prior to the loose engagement, the consumable body 1003 can be disposed in the hollow body of the mounting element 1002 and the consumable tip 1001 can be rotatably engaged to the distal end 1012 of the mounting element 1002.

After the loose engagement between the proximal end 1014 of the mounting element 1002 and the torch body 1005 via the plasma processing interface 1004, the consumable tip 1001 can be oriented/adjusted relative to the mounting element 1002 about the longitudinal axis A to attain a specific radial orientation of the asymmetric feature of the consumable tip 1001 with respect to the longitudinal axis A (step 1804). For example, in the case of flush cutting, the aligned nozzle exit orifice 225 and shield exit orifice 1104 can be positioned at a specific radial orientation about the longitudinal axis A, which in turn rotates the first alignment surface 1122 and/or the second alignment surface 1126 of the shield 1104 to a position so that they can fit into a corner of a workpiece to perform flush cutting. In the case of selective gouging or cutting with the nozzle 1600 incorporated in the consumable tip 1001, the consumable tip 1000 can be rotated to a desired radial orientation such that the major axis of the elliptical cross section 1608 of the nozzle exit orifice 1604 is either parallel or perpendicular to the direction of the torch operation, depending on whether cutting or gouging is desired by the operator.

After the consumable tip 1001 is positioned at a desired radial orientation, the proximal end 1014 of the mounting element 1002 is fixedly engaged to the plasma processing interface 1004 by, for example, tightening the remaining 20% of the threads (step 1806). The fixed engagement imparts a frictional force between the mounting element 1002 and the consumable tip 1001 to both axially and radially secure the consumable tip 1001 to the torch body 1005, such that the asymmetric feature of the torch tip is 1001 is locked at the specific radial orientation (set from step 1804).

It should also be understood that various aspects and embodiments of the invention can be combined in various ways. Based on the teachings of this specification, a person of ordinary skill in the art can readily determine how to combine these various embodiments. A person of ordinary skill in the art can also readily determine how to manufacture the nozzles and/or shields of the present technology. An exemplary manufacturing method can include fabricating the nozzle body 250 (of FIG. 2A) having a longitudinal axis A extending therethrough, forming the nozzle exit orifice 225 in the nozzle body 250 that is oriented at a non-zero angle relative to the longitudinal axis A, and locating at least one alignment surface 254 on an external surface of the nozzle body 250. The method can also include fabricating a shield to include one or more of the above-described elements. Another exemplary manufacturing method can include fabricating the nozzle body 450 (of FIG. 7A) having a longitudinal axis 446 extending therethrough, forming the nozzle exit orifice 425 in the nozzle body 450 oriented at a non-zero bevel angle 444 relative to the longitudinal axis 446, and locating at least one alignment surface 454 on the nozzle body 450 that is generally parallel to the longitudinal axis 446. The bevel angle 444 can be between about 20 to about 60 degrees relative to the longitudinal axis 446. As described above with reference to FIG. 6, the alignment surface 454 can be dimensioned to align the plasma arc exiting the nozzle exit orifice 425 to impinge on the processing surface 438 of the workpiece 430 at the bevel angle 444 while the plasma arc torch 400 is oriented substantially perpendicular to the processing surface 438. The method can also include fabricating a shield to include one or more of the above-described features. In some embodiments, the method of manufacturing can include coating the nozzle and/or shield with an electrically insulating material. The method of manufacturing can further include disposing a set of bearings in/on the alignment surface 454 to reduce an amount of friction created when the alignment surface 454 slidingly contacts the guiding surface 436 of the template 432. In addition, the alignment surface 454 can be fabricated to be substantially planar to facilitate the sliding contact with the guiding surface 436. In some embodiments, the method of manufacturing includes locating a second alignment surface 456 on an exterior surface of the nozzle body 450 that is substantially perpendicular to the alignment surface 454. The exterior opening 425a of the nozzle exit orifice 425 can be fabricated on the second alignment surface 456 to introduce a plasma arc to the workpiece 430. In addition, modifications may occur to those skilled in the art upon reading the specification. The present application includes such modifications and is limited only by the scope of the claims.

What is claimed is:

1. A consumable set for a plasma arc torch configured to generate a plasma arc, the plasma arc torch and the consumable set defining a central longitudinal axis extending therethrough, the consumable set comprising:
    a consumable tip configured to direct a plasma arc to a workpiece, the consumable tip alignable along the central longitudinal axis and comprising a plurality of consumable components, at least one of the plurality of consumable components includes an asymmetric feature asymmetrically disposed in the consumable tip relative to the central longitudinal axis, the asymmetric feature of the consumable component defines at least one of (i) an axis of the consumable component that is oriented at a non-zero angle relative to the central longitudinal axis, (ii) an axis of the consumable component that is offset from the central longitudinal axis or (iii) an asymmetric cross section of the consumable component about the central longitudinal axis; and
    a mounting element, comprising an inner retaining cap and an outer retaining cap, for coupling the consumable tip to a torch body, the mounting element configured to (i) axially secure the consumable tip relative to the torch body between the inner and outer retaining caps while permitting independent rotation of the consumable tip relative to the central longitudinal axis during assembly, the independent rotation permits positioning of the consumable tip at a specific radial orientation relative to the central longitudinal axis, and (ii) both axially and radially fix the consumable tip with respect to the torch body by at least one of the inner or outer retaining cap such that the asymmetric feature is locked at the specific radial orientation relative to the central longitudinal axis after securement while permitting the plasma arc to pass through the consumable components of the consumable tip.

2. The consumable set of claim 1, wherein the plurality of consumable components of the consumable tip comprises a nozzle and a shield.

3. The consumable set of claim 2, wherein the consumable tip further comprises a locking element configured to radially affix at least two of the plurality of consumable components with respect to each other.

4. The consumable set of claim 3, wherein the plurality of consumable components and the locking element include complementary features configured to inter-fit with one another to orient the asymmetric feature.

5. The consumable set of claim 4, wherein the complementary features comprise a flat surface disposed on a circumferential section of each of the consumable components and the locking element.

6. The consumable set of claim 3, wherein each of the plurality of consumable components comprises an asymmetric feature asymmetrically disposed relative to the longitudinal axis, and the locking element maintains radial and axial alignment among the asymmetric features.

7. The consumable set of claim 3, wherein the nozzle comprises an asymmetric nozzle exit orifice and the shield comprises an asymmetric shield exit orifice, and the locking element is configured to maintain radial and axial alignment between the nozzle exit orifice and the shield exit orifice.

8. The consumable set of claim 1, further comprising:
    a consumable body comprising at least an electrode; and
    a plasma processing interface coupled to the torch body, wherein the mounting element is configured to retain the consumable body and the consumable tip to the torch body via fixed engagement with the plasma processing interface to achieve the securement.

9. The consumable set of claim 8, further comprising an ejector feature, connected to the mounting element, configured to disconnect the consumable body and the consumable tip from the plasma processing interface.

10. The consumable set of claim 8, wherein the mounting element comprises a proximal end configured to fixedly engage the plasma processing interface after securement.

11. The consumable set of claim 8, wherein the mounting element is at least one of rotatable or translatable relative to the torch body and the consumable tip during assembly prior to the fixed engagement with the plasma processing interface.

12. The consumable set of claim 10, wherein the fixed engagement of the mounting element with the plasma processing interface at the proximal end causes the mounting element to impart a frictional force on the consumable tip at a distal end of the mounting element, thereby causing the mounting element to fixedly engage the consumable tip at the distal end, such that the asymmetric feature of the consumable tip is locked at the specific radial orientation relative to the longitudinal axis after securement.

13. The consumable set of claim 10, wherein the fixed engagement of the mounting element with the plasma processing interface at the proximal end locks the consumable body in a specific radial orientation relative to the longitudinal axis.

14. A method for assembling the consumable set of the plasma arc torch of claim 1, the method comprising:
loosely engaging a proximal end of the mounting element to the torch body, wherein a distal end of the mounting element axially secures the consumable tip while permitting independent rotation of the consumable tip relative to the mounting element;
orienting the consumable tip relative to the mounting element about the longitudinal axis to achieve the specific radial orientation of the asymmetric feature with respect to the longitudinal axis; and
fixedly engaging the mounting element to the torch body, wherein the fixed engagement imparts a frictional force between the mounting element and the consumable tip to both axially and radially secure the consumable tip to the torch body, such that the asymmetric feature of the torch tip is locked at the specific radial orientation relative to the longitudinal axis of the plasma arc torch after the fixed engagement.

15. The method of claim 14, further comprising assembling the consumable tip having the plurality of consumable components by fixedly locking the plurality of consumable components to each other.

16. The method of claim 15, further comprising connecting the consumable tip to the mounting element, such that the mounting element axially secures the consumable tip while permitting independent rotation of the consumable tip relative to the mounting element prior to the fixed engagement.

17. The method of claim 14, wherein the plurality of consumable components of the consumable tip comprises a nozzle and a shield.

18. The method of claim 15, wherein assembling the consumable tip further comprises aligning and inter-fitting one or more complementary features of the plurality of consumable components with one another to orient the asymmetric feature.

19. The method of claim 14, wherein the fixed engagement of the mounting element to the torch body retains a consumable body and the consumable tip to the torch body.

20. The method of claim 19, further comprising locking the consumable body to the torch body in a specific radial orientation relative to the longitudinal axis of the plasma arc torch upon fixedly engaging the mounting element to the torch body.

21. The method of claim 14, further comprising rotating or translating the mounting element relative to the consumable tip or the torch body prior to the fixed engagement of the mounting body to the torch body.

* * * * *